United States Patent
Sohma et al.

(10) Patent No.: US 7,587,403 B2
(45) Date of Patent: Sep. 8, 2009

(54) INFORMATION INPUT APPARATUS, INFORMATION INPUT METHOD, CONTROL PROGRAM, AND STORAGE MEDIUM

(75) Inventors: Hidetomo Sohma, Tokyo (JP); Hiroshi Tojo, Tokyo (JP); Tomomi Takata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 11/007,079

(22) Filed: Dec. 7, 2004

(65) Prior Publication Data

US 2005/0160067 A1 Jul. 21, 2005

(30) Foreign Application Priority Data

Dec. 25, 2003 (JP) ............................ 2003-430422

(51) Int. Cl.
*G06F 17/30* (2006.01)
(52) U.S. Cl. ....................... 707/101; 707/102
(58) Field of Classification Search ............. 347/207.1; 709/223; 707/101, 104.1, 102
See application file for complete search history.

(56) References Cited

U.S. PATENT DOCUMENTS

| 2002/0047905 | A1* | 4/2002 | Kinjo ........................ 348/207 |
| 2002/0059406 | A1* | 5/2002 | Tanaka et al. ............... 709/223 |
| 2003/0009568 | A1* | 1/2003 | McIntyre ................... 709/229 |
| 2004/0201683 | A1* | 10/2004 | Murashita et al. ........ 348/207.1 |

FOREIGN PATENT DOCUMENTS

| JP | 06-067291 A | 3/1994 |
| JP | 2002-073508 A | 3/2002 |
| JP | 2002-094857 A | 3/2002 |
| JP | 2002-366565 A | 12/2002 |

OTHER PUBLICATIONS

Morikawa et al., "Cell-Phone Based User Activity Recognition, Management and Utilization", Proceedings of 7th Int'l Conference on Mobile Data Management, May 2006. Retrieved from the Internet:<URL: http://ieeexplore.ieee.org/search/wrapper.jsp?arnumber=1630587>.*

Sarvas et al., "Metadata Creation System for Mobile Images", Proceedings of the 2nd international conference on Mobile systems, applications, and services, p. 36-48, Jun. 2004. Retrieved from the Internet:<URL: http://portal.acm.org/ft_gateway.cfm?id=990072&type=pdf&coll=ACM&dl=ACM&CFID=41535606&CFTOKEN=75112289>.*

* cited by examiner

*Primary Examiner*—John E Breene
*Assistant Examiner*—Dennis Myint
(74) *Attorney, Agent, or Firm*—Canon U.S.A. Inc., I.P. Division

(57) ABSTRACT

An information input apparatus for inputting content information and obtaining attribute information for identifying the content information. By transmitting the obtained attribute information to other apparatuses when the content information is input, attribute information can be easily added to the content information. Then, the attribute information added to the content information can be distributed.

11 Claims, 19 Drawing Sheets

CONTENT DATA STRUCTURE

FIG. 13

```
<?xml version='1.0' encoding='Unicode' ?>
<PERSONAL META-DATA>
  <NAME>TARO YAMASHITA</NAME>
  <OCCUPATION>OFFICE WORKER</OCCUPATION>
  <HOME>
    <ADDRESS>123-456 XXX, XXX, KAWASAKI,
      JAPAN</ADDRESS>
    <TELEPHONE NO. >123-456-7890</TELEPHONE NO. >
    <EMAIL ADDRESS>XXX@OOO.ne.jp</EMAIL
      ADDRESS>
  </HOME>
  <PLACE OF EMPLOYMENT>
    <COMPANY NAME>XX CO. , LTD.</COMPANY NAME>
    <ADDRESS>1-23-456, XXX, XXX, TOKYO,
      JAPAN</ADDRESS>
    <TELEPHONE NO. >00-1234-5678</TELEPHONE NO. >
    <DEPARTMENT NAME>SALES DEPARTMENT
    </DEPARTMENT NAME>
    <EMAIL ADDRESS>XXX@OOO.co.jp</EMAIL
      ADDRESS>
  </PLACE OF EMPLOYMENT>
  <BIRTH DATE>1965. 03. 30</BIRTH DATE>
</PERSONAL META-DATA>
```

FIG. 14

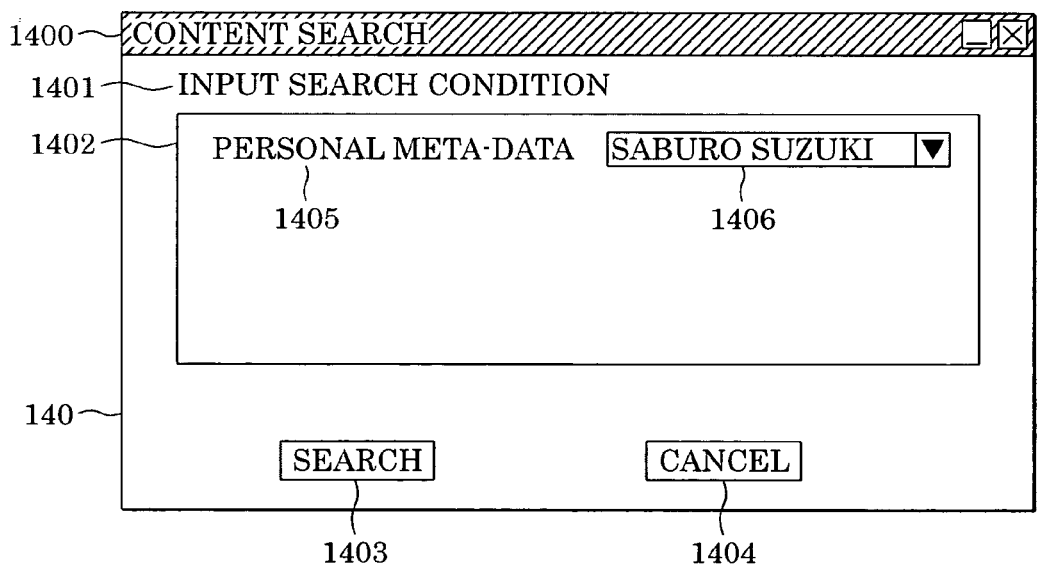

INFORMATION INPUT APPARATUS, INFORMATION INPUT METHOD, CONTROL PROGRAM, AND STORAGE MEDIUM

CROSS REFERENCE TO RELATED APPLICATIONS

This application claims priority from Japanese Patent Application No. 2003-430422 filed Dec. 25, 2003, which is hereby incorporated by reference herein.

BACKGROUND OF THE INVENTION

1. Field of the Invention

The present invention relates to a system for managing multimedia content such as moving images, still images, and/or audio.

2. Description of the Related Art

When an image of a person is captured by a digital camera or a digital video camcorder, for the person being captured in the image (hereinafter referred to as the photographee) to be able to view the image, the person has to search for the data content including the image and access this data content to copy the image onto a personal device. In particular, it is a burden for a user to search for the data content including the desired image, e.g., an image of a user and/or a friend of the user. Moreover, this burden has increased even more since data content is often shared and the cumulated amount of data included in the data content is enormous.

To deliver the desired content data to a photographee, the photographer will need to obtain the photographee's personal information such as an E-mail address. To obtain this information, however, time and work is required in addition to the time and work required for capturing and preparing the image.

To solve these problems, a method for directly or indirectly adding additional information (hereinafter referred to as 'meta-data'), such as an ID, time, location, an E-mail address of the photographee to an image has been researched. In some cases, the method has actually been implemented.

An example is an apparatus for obtaining information that can be used as meta-data in which the meta-data is recorded in association with an image in the imaging apparatus. For example, Japanese Patent Laid-Open No. H06-67291 discloses a method for adding a positioning function based on a global positioning system (GPS) to an imaging apparatus and recording positional information obtained by the GPS function together with an image. Here, the positioning function is a function for determining a position based on GPS signals emitted from at least three orbiting GPS satellites.

Portable terminals, such as personal data assistants (PDAs) and cellular phones, are also put to wide use. Personal information, such as an E-mail address, telephone number, and personal schedule, stored in these portable terminals can be used as meta-data. Wire communication technologies, such as RS232C, USB, IEEE1394, P1284, SCSI, a modem, and Ethernet, can easily be applied to such portable terminals. Moreover, the development of wireless communication has progressed. Some known wireless communication technologies include Bluetooth, using radio waves in the bandwidth of 2.4 GHz having a maximum communication distance of 10 m to 100 m, IEEE802.11b wireless LAN, using radio waves in the bandwidth of 2.4 GHz having a maximum communication distance of about 100 m, and IrDA, using infrared rays having a maximum communication distance of about 2 m.

A method for obtaining personal information from a portable terminal held by a photographer or photographee and adding this information to an image as meta-data by adding a wireless communication function to an imaging apparatus is proposed. Such a method is disclosed in, for example, Japanese Patent Laid-Open No. 2002-94857.

This kind of personal information, however, is information concerning individual privacy, and, thus, it is problematic to carelessly attach this information to an image as meta-data. For example, when using a service such as photo sharing, the photographee has to disclose his/her personal data to receive or search for an image in the content data.

Furthermore, for known technologies, normally, only the photographer is allowed to add meta-data to an image or to use the meta-data since the procedures for adding meta-data to an image are carried out on the imaging apparatus.

SUMMARY OF THE INVENTION

In the present invention, meta-data can be added to an image so that a desired image can be found through a search of content data. Moreover, the present invention enables the meta-data to be easily obtained so that a search using the meta-data can be easily conducted.

Furthermore, in the present invention, personal information of a photographee can be used so that a search can be conducted in accordance with particular search conditions provided by the photographee while maintaining user-friendliness of the meta-data and securing individual privacy.

An aspect of the present invention provides an information input apparatus comprising: input means for inputting content information; acquisition means for acquiring attribute information for identifying the content information input via the input means; and transmission means for transmitting the attribute information acquired by the acquisition means to another apparatus when the content information is input via the input means.

Another aspect of the present invention provides an information processor comprising: receiving means for receiving attribute information obtained by and sent from an information input apparatus when content information is input to the information input apparatus, the attribute information being for identifying the content information; and information storage means for storing the attribute information received by the receiving means.

Another aspect of the present invention provides a retrieve apparatus comprising: receiving means for receiving content information and attribute information to identify the content information from a first apparatus, the first apparatus having acquired the attribute information when the content information was input to the first apparatus; and retrieve means for retrieving the content information from a second apparatus based on the attribute information, the attribute information having been transmitted to the second apparatus when the content information was input to the first apparatus.

Another aspect of the present invention provides a method for inputting information at an information input apparatus. The method comprises: inputting content information; acquiring attribute information for identifying the content information input; and transmitting the attribute information acquired to another apparatus when the content information is input.

Yet another aspect of the present invention provides a method for processing information. The method comprises: receiving attribute information obtained by and sent from an information input apparatus when content information is input to the information input apparatus, the attribute information being for identifying the content information; and storing the attribute information received.

Still another aspect of the present invention provides a method for retrieving. The method comprises: receiving content information and attribute information to identify the content information from a first apparatus, the first apparatus having acquired the attribute information when the content information was input to the first apparatus; and retrieving the content information from a second apparatus based on the attribute information, the attribute information having been transmitted to the second apparatus when the content information was input to the first apparatus.

Further features and advantages of the present invention will become apparent from the following description of exemplary embodiments (with reference to the attached drawings).

BRIEF DESCRIPTION OF THE DRAWINGS

FIG. 13 illustrates an example of the data structure of personal meta-data.

FIG. 14 illustrates an example of a screen shot for when a search condition based on personal meta-data is inputted.

DESCRIPTION OF THE EMBODIMENTS

Exemplary embodiments of the present invention are described in detail below with reference to the drawings.

First Embodiment

An embodiment of an information input apparatus and a method for controlling the information input apparatus according to the present invention will now be described. In the description below, an imaging apparatus is described as an embodiment of the information input apparatus according to the present invention.

Figure 1:
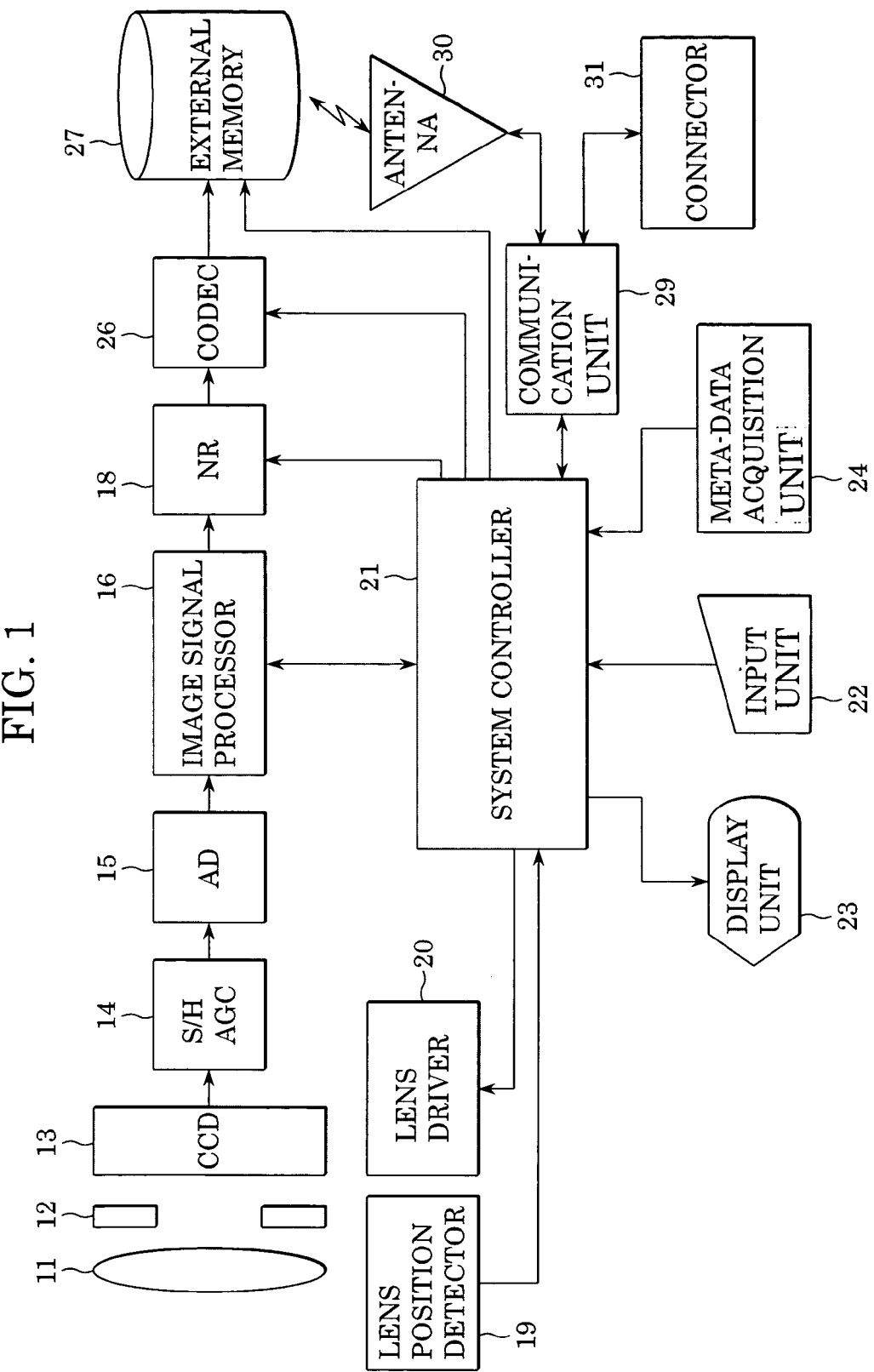
FIG. 1 is a block diagram illustrating the structure of an imaging apparatus according to an embodiment of the present invention.

FIG. 1 is a block diagram illustrating the structure of the imaging apparatus according to this embodiment. The components illustrated in FIG. 1 are described below. A lens unit 11 is provided for forming an image of a subject. The lens unit 11 includes a focus lens for adjusting the subject distance and a zoom lens for adjusting the focal distance. An iris 12 is provided for adjusting the amount of light entering the lens unit 11. An imaging element 13 includes a CCD (charge-coupled device) and is provided to convert the received light into an electronic signal. A sample-hold AGC (automatic gain control) circuit 14 is provided for adjusting the sample/hold and gain. An analog to digital (A/D) converter 15 is provided for analog to digital conversion. An image signal processor 16 is provided to generate an image signal by processing a signal. A noise reduction (NR) unit 18 is provided to remove noise from the image signal. The noise reduction (NR) unit 18 includes a field memory. A lens position detector 19 is provided to detect the position of the lenses. A lens driver 20 is provided to drive the lenses.

Figure 2:
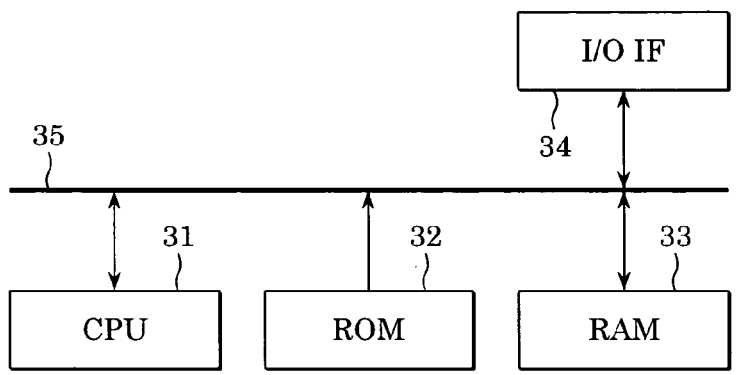
FIG. 2 is a block diagram illustrating the structure of a system controller according to an embodiment of the present invention.

A system controller 21 is provided to control the entire imaging apparatus. FIG. 2 is a block diagram illustrating the structure of the system controller 21. The system controller 21 includes a known CPU (central processing unit) 31, a known ROM (read-only memory) 32, a known RAM (random-access memory) 33, a known I/O (input/output) interface 34, and a known bus 35. The ROM 32 stores programs executed by the CPU 31 (described below) and table values.

The noise reduction (NR) unit 18 is constituted of a cyclic noise reduction circuit. A CODEC 26 is provided to code image data. For example, the CODEC 26 codes a static image into JPEG (Joint Photographic Experts Group) and a moving image into MPEG-1 (Moving Picture Experts Group-1) or MPEG-2. An external memory 27 includes a recording medium, such as a hard disk, a floppy disk, an optical disk, a magnetic disk, a magnetic-optical disk, a magnetic tape, or a non-volatile memory card, and a driver for driving the recording medium and recording information.

An input unit 22 may be a keyboard, a mouse, a stylus pen, a dial, or some combination thereof providing a user with various input operation environments. A display unit 23 is provided to display the various states of the input operation for the user. The display unit 23 may be a display.

A meta-data acquisition unit 24 is capable of acquiring meta-data and includes devices such as a clock, a calendar, a GPS, a compass, a thermometer, a hygrometer, and an illuminometer for measuring time, date, latitude and longitude, orientation, temperature, humidity, and brightness, respectively.

A communication unit 29 is provided on the imaging apparatus to communicate with other apparatuses and is provided with various wire communication functions such as RS232C, USB (universal serial bus), IEEE1394, P1284, SCSI (small computer system interface), a modem, and Ethernet and various wireless communication functions such as Bluetooth, infrared data communication, and IEEE802.11b. The imaging apparatus is also provided with an antenna 30 to wirelessly communicate with other apparatuses via the communication unit 29. A connector 31 is provided for connecting the imaging apparatus with other apparatuses via the communication unit 29.

The operation of each component of the imaging apparatus when recording image data will now be described. The light from the subject received by the lens unit 11 passes through the iris 12, where the amount of light is adjusted to form an image on the surface of the imaging element 13. Then, after the light is converted into an electronic signal at the imaging element 13, the electronic signal is converted from analog into digital at the A/D converter 15 via a sample-hold AGC circuit 14. Then, the digital signal is sent to the image signal processor 16.

The image signal processor 16 generates an image signal by carrying out processes such as aperture correction, gamma correction, and white balance correction on the brightness and each color component of the input signal. Then, the image signal processor 16 sends the generated image signal to the noise reduction (NR) unit 18.

The noise reduction (NR) unit 18 is controlled to remove noise from the image signal by a control signal from the system controller 21. After noise is removed, the image signal is sent to the CODEC 26. At the CODEC 26, the image signal is coded and then sent to the external memory 27.

The system controller 21 determines the position (the tele end (most telescopic point) and the wide end (the most pantoscopic point), or a point between the tele end and the wide end) of the zoom lens of the lens unit 11 according to a lens position detection signal sent from the lens position detector 19. The system controller 21 also changes the noise reduction efficiency (i.e., amount of noise removed) by changing the control value of noise reduction when zoom is on or off and by sending a control signal to the noise reduction unit 18. The control value to be changed is the cyclic coefficient K. The control value is also changed in accordance with the brightness of the subject. The darker the subject, the worse the signal-to-noise ratio (S/N) of the image signal. Thus, in order to compensate for this, the control value is changed to improve the noise reduction efficiency. The system controller 21 controls the iris 12, the sample-hold AGC circuit 14, and the electronic shutter (not shown in FIG. 1) to maintain the generated image signal at a predetermined level relative to the number of optical signals received from the subject. In this way, the system controller 21 comprehensively determines the brightness of the subject from the aperture, AGC gain, and electronic shutter speed used to control the exposure.

The imaging operation described above is a general operation. The imaging operation according to the present invention is not limited to the above-described operations as long as an image is captured.

Next, the handling of meta-data will be described. First, the operation of each component for obtaining meta-data will be described below.

Meta-data can be obtained through various methods such as obtaining data collected by the meta-data acquisition unit 24; directly inputting information using the input unit 22 (at this time, the system controller 21 can display the input information on the display unit 23 so that the user can confirm the input); receiving information from other apparatuses by using the communication unit 29 and the antenna 30 or connector 31; reading data converted into image data, such as a bar code, through the lens unit 11 and then reconverting this data at the system controller 21; reading text data as image data from the lens unit 11 and then performing optical character recognition (OCR) at the system controller 21 to convert the image data back to text data; reading out information stored in advance in the ROM 32 of the system controller 21; reading out information stored in advance in the external memory 27; or obtaining new information by using dictionary information stored in the system controller 21 in correspondence with the information obtained by the meta-data acquisition unit 24 or the information received from other apparatuses using the communication unit 29 and the antenna 30 or the connector 31. Meta-data can also be obtained through a combination of the above-mentioned methods.

Next, the operation of each component to link meta-data to image data and store this linked data will be described. The system controller 21 sends the meta-data obtained by one of the above-mentioned methods to the CODEC 26 by inserting the meta-data into the coded image data, or the system controller 21 directly sends the meta-data to the external memory 27 to record the meta-data as a file including a file ID (details of this will be described below).

The operation of each component to receive and transmit meta-data will be described below. Meta-data is exchanged between a portable terminal and the communication unit 29 via the antenna 30 or the connector 31.

The information input apparatus according to the present invention is not limited to the above, as long as the above-described operations are capable of being carried out. The information input apparatus according to the present invention may be, for example, an imaging apparatus for capturing a static image, such as a digital camera or a scanner, an imaging apparatus for capturing a moving image, such as a digital video camcorder, a personal computer including a camera, or a cellular phone with a built-in camera.

Figure 3:
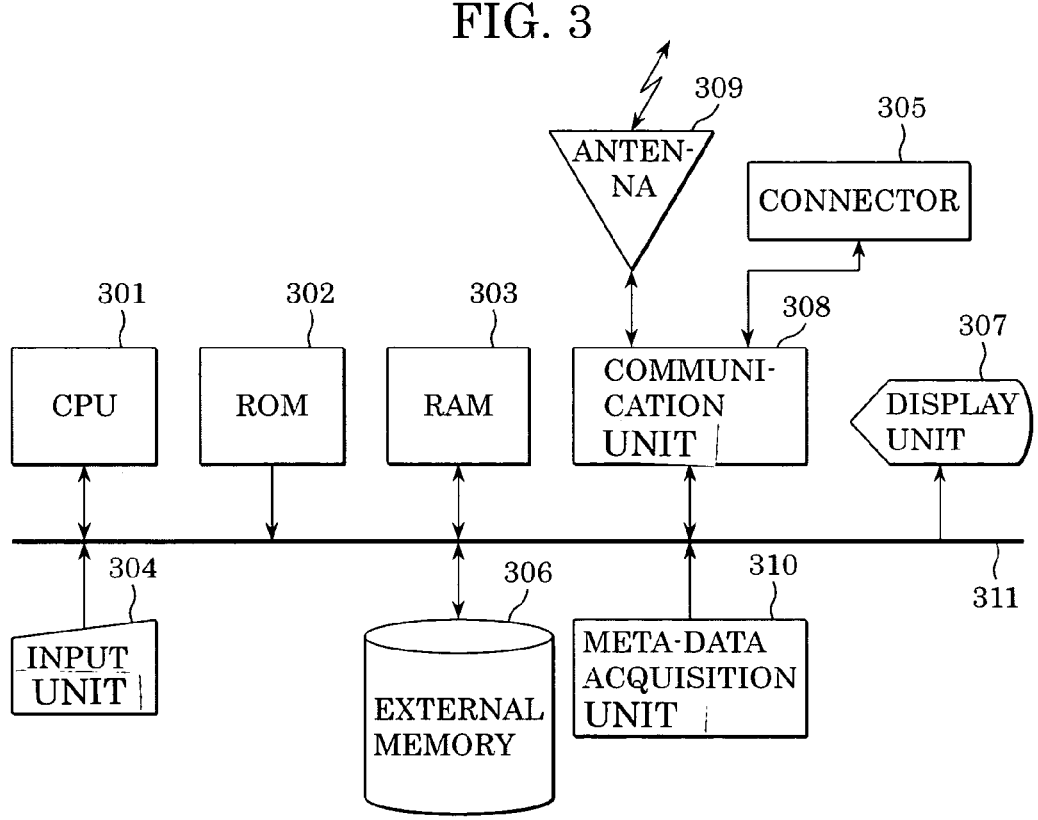
FIG. 3 is a block diagram illustrating the structure of a portable terminal according to an embodiment of the present invention.

FIG. 3 is a block diagram illustrating the structure of an information processor according to this embodiment. According to this embodiment, the information processor is a portable terminal. The components illustrated in FIG. 3 are described below. A CPU 301 executes control programs of the portable terminal according to this embodiment. A ROM 302 stores the boot program executed at start-up and various other data. A RAM 303 stores control programs processed by the CPU 301 and provides a work area for the CPU 301 to execute various control programs. An input unit 304 may be a keyboard, a mouse, a stylus pen, a dial, or a combination thereof, providing a user with various input operation environments.

An external memory 306 includes a recording medium, such as a hard disk, a floppy disk, an optical disk, a magnetic disk, a magnetic-optical disk, a magnetic tape, or a non-volatile memory card, and a driver for driving the recording medium and recording information. A display unit 307 is provided to display various states of the input operation for the user. The display unit 307 may be a display. A communication unit 308 is provided to communicate with other apparatuses and is provided with various wire communication functions such as RS232C, USB, IEEE1394, P1284, SCSI, a modem, and Ethernet and various wireless communication functions such as Bluetooth, infrared data communication, and IEEE802.11b. An antenna 309 is provided for the imaging apparatus to wirelessly communicate with other apparatuses via the communication unit 308. A connector 305 is provided for connecting the imaging apparatus with other apparatuses via the communication unit 308.

The operation of each component to receive and transmit meta-data will be described below. Meta-data is exchanged between the above-mentioned imaging apparatus and the communication unit 308 via the antenna 309 or the connector 305. The received meta-data is stored in an external memory 306.

The operation of each component for obtaining meta-data to be sent to the information input apparatus, i.e., the imaging apparatus, will be described below. Meta-data can be obtained through various methods such as reading out the meta-data from the external memory 306; reading out the meta-data from the ROM 302; obtaining meta-data from a meta-data acquisition unit 310; inputting meta-data via the input unit 304; or obtaining meta-data via the communication unit 308 and the antenna 309 or the connector 305.

The information processor according to the present invention is not limited to the above, as long as the above-described operations are capable of being carried out. The information processor according to the present invention may be, for example, a personal terminal, such as a PDA, a personal computer, a cellular phone, an imaging apparatus for capturing a static image, such as a digital camera or a scanner, or an imaging apparatus for capturing a moving image, such as a digital video camcorder.

Figure 4:
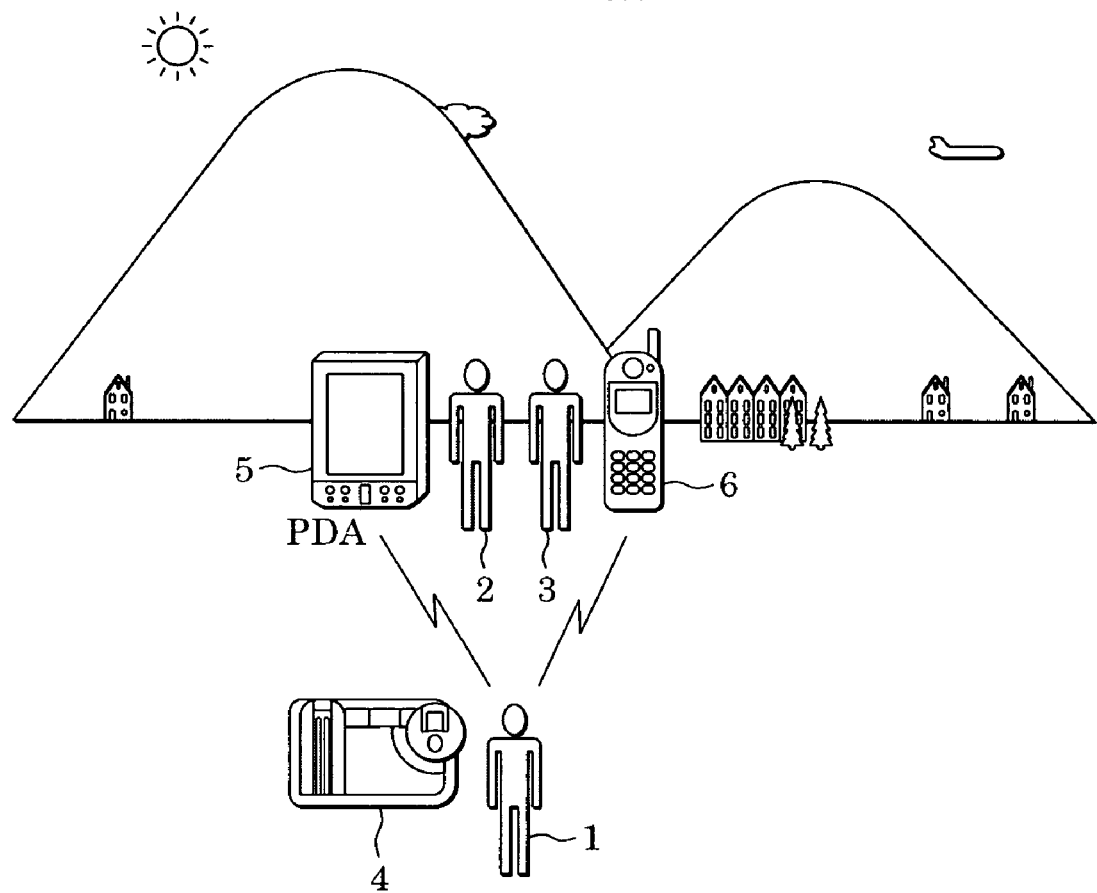
FIG. 4 illustrates a case in which image capturing according to an embodiment of the present invention is performed.

FIG. 4 illustrates a case in which image capturing according to an embodiment of the present invention is performed. Persons 1 to 3 are friends participating in a group tour and are about to take a commemorative photograph. The person 1 is the photographer (hereinafter referred to as 'photographer 1') trying to capture an image of his/her friends, the persons 2 and 3 (hereinafter referred to as 'photographees 2 and 3'), with a digital camera 4, which is one of the above-mentioned imaging apparatuses. The photographee 2 has a PDA 5, which is an example of the above-mentioned portable terminal. The photographee 3 has a cellular phone 6, which is also an example of the above-mentioned portable terminal.

Figure 7:
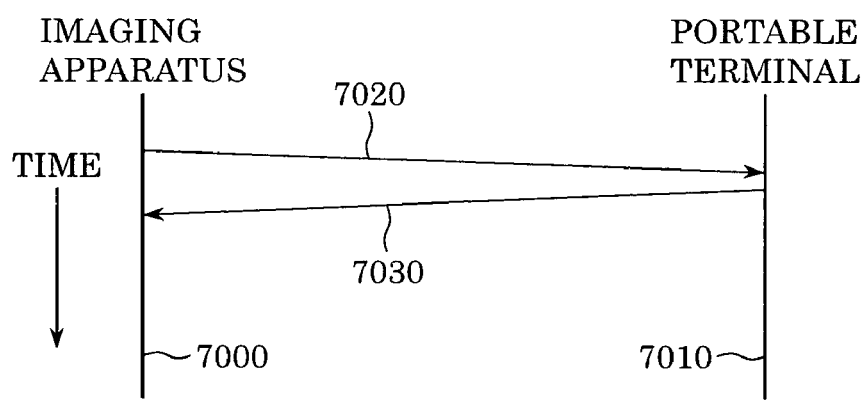
FIG. 7 illustrates an example of data exchange between an imaging apparatus and a portable terminal when performing image capturing according to an embodiment of the present invention.

FIG. 7 illustrates data exchange between the imaging apparatus 7000 and the portable terminal 7010 when capturing an image. Time elapses along the line in the downward direction.

First, a group ID is set for the imaging apparatus and the portable terminal. The group ID is identification for the group to which the imaging apparatus and the portable terminal (i.e., the users of the apparatuses) belong to. For example, a group ID is used to distinguish between the imaging apparatuses and the portable terminals possessed by the participants of two different group tours at a tourist site. Furthermore, a group ID may be used to identify various groups, such as friends and families, in the same tour group.

Before the data exchange is performed, as described below, a process such as authentication is required to enable the imaging apparatus and the portable terminal to transmit and receive data between each other. Details of such a process depend on the specification of the communication protocol, such as Bluetooth or IrDA. The present invention may be applied to any type of communication protocol. Therefore, a detailed description of a process carried out for such communication protocols is omitted.

When the photographer 1 captures an image, the imaging apparatus sends basic meta-data to the portable terminals held by the photographees 2 and 3 via wireless communication (refer to arrow 7020). Basic meta-data is meta-data that is independent from the subject of the image and includes data items such as a group ID, time and date when the image was captured, an imaging apparatus ID identifying the imaging apparatus used for capturing the image, a content ID for identifying how many other images were taken before the image, a user ID for identifying the user, data such as the latitude, the longitude, and the place name of the site where the image was captured, the orientation of the imaging apparatus when the image was captured, and data such as the temperature, the humidity, and the brightness when the image was captured. The basic meta-data does not necessarily have to include all of these data items, but necessarily has to include information to identify the content when communicating between the imaging apparatus and the portable terminals.

Next, after the portable terminal receives the meta-data from the imaging apparatus, the portable terminal checks whether or not the group ID included in the received basic meta-data is the same as the group ID registered for the portable terminal possessed by photographees 2 and 3. If the group IDs are the same, the portable terminal immediately sends back a confirmation notifying that it has been captured in an image (arrow 7030 in FIG. 7 represents this confirmation). In the above case, confirmations are sent from the PDA 5 and the cellular phone 6. These confirmations are not limited to a specified type of data and, for example, may be any predetermined value.

In this embodiment, communication is enabled before exchanging data as indicated by the arrows 7020 and 7030. The process required for starting communication and data exchange represented by arrows 7020 and 7030 may be carried out simultaneously. In other words, when the imaging apparatus sends data as indicated by the arrow 7020, the basic meta-data including the imaging apparatus ID can also be transmitted. Then, after the portable terminal authenticates the imaging apparatus, the portable terminal can send back a confirmation together with a portable terminal ID to the imaging apparatus when transmitting data as indicated by the arrow 7030 to establish communication between the imaging apparatus and the portable terminal.

The above-described process of transmitting basic meta-data from the imaging apparatus to the portable terminal when capturing an image will be described in detail below. There are two types of wireless communication; one with directivity and one without directivity. Either wireless communication unit may be used for the present invention. However, wireless communication having directivity is more convenient compared to wireless communication without directivity. The reason for this will also be explained below.

Figure 5:
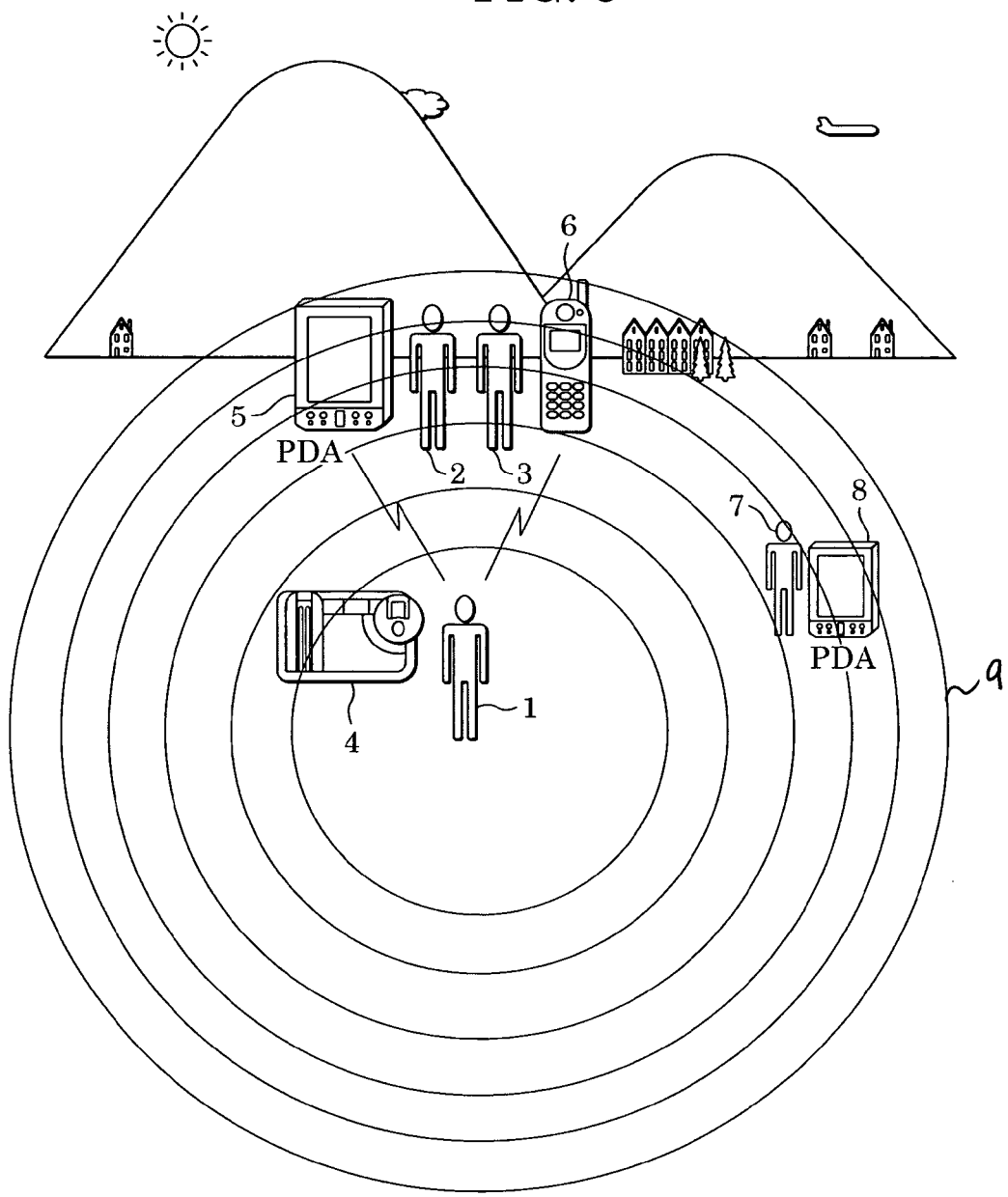
FIG. 5 illustrates a case in which image capturing according to an embodiment of the present invention is performed. In this case, the wireless communication has directivity.
Figure 6:
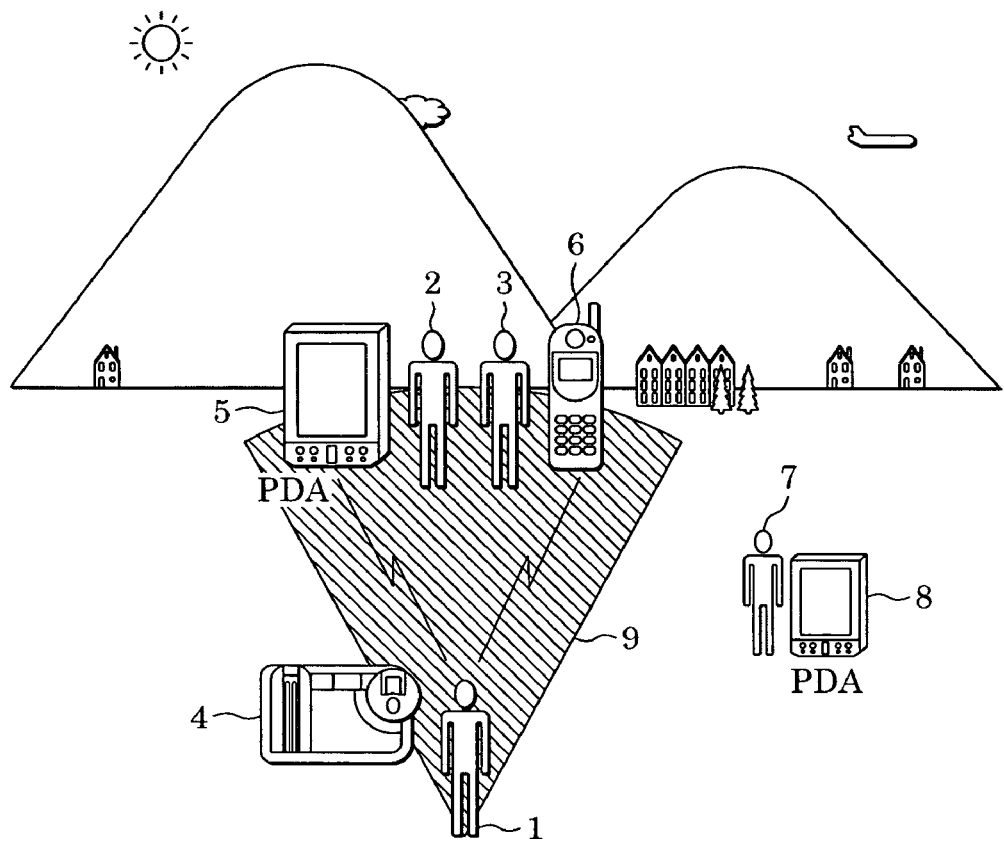
FIG. 6 illustrates a case in which image capturing according to an embodiment of the present invention is performed. In this case, the wireless communication does not have directivity.

FIG. 5 illustrates a case in which the wireless communication does not have directivity. The reference numerals 1 to 6 in FIG. 5 represent the same components as those in FIG. 4. In addition, FIG. 5 includes a person 7 who is positioned close to photographer 1 but is not in the range of imaging. The person 7 holds a PDA 8. The digital camera 4 is capable of performing wireless communication within range 9. At this time, the person 7 is not in the range of imaging but is in the range 9 of wireless communication. Therefore, basic meta-data is transmitted to the PDA 8 held by the person 7. Accordingly, the person 7 will have to distinguish between the basic meta-data received along with an image and the basic meta-data received without an image. On the other hand, FIG. 6 illustrates a case in which the wireless communication (such as IrDA) has directivity. The reference numerals 1 to 6 in FIG. 6 represent the same components as those in FIGS. 4 and 5, and the reference numerals 7 and 8 in FIG. 6 represent the same components as those in FIG. 5. The digital camera 4 is capable of transmitting radio waves and infrared rays within the range 9. If the transmitting range 9 and the imaging range are the same, basic meta-data is not sent to the PDA 8 held by the person 7.

Figure 8:
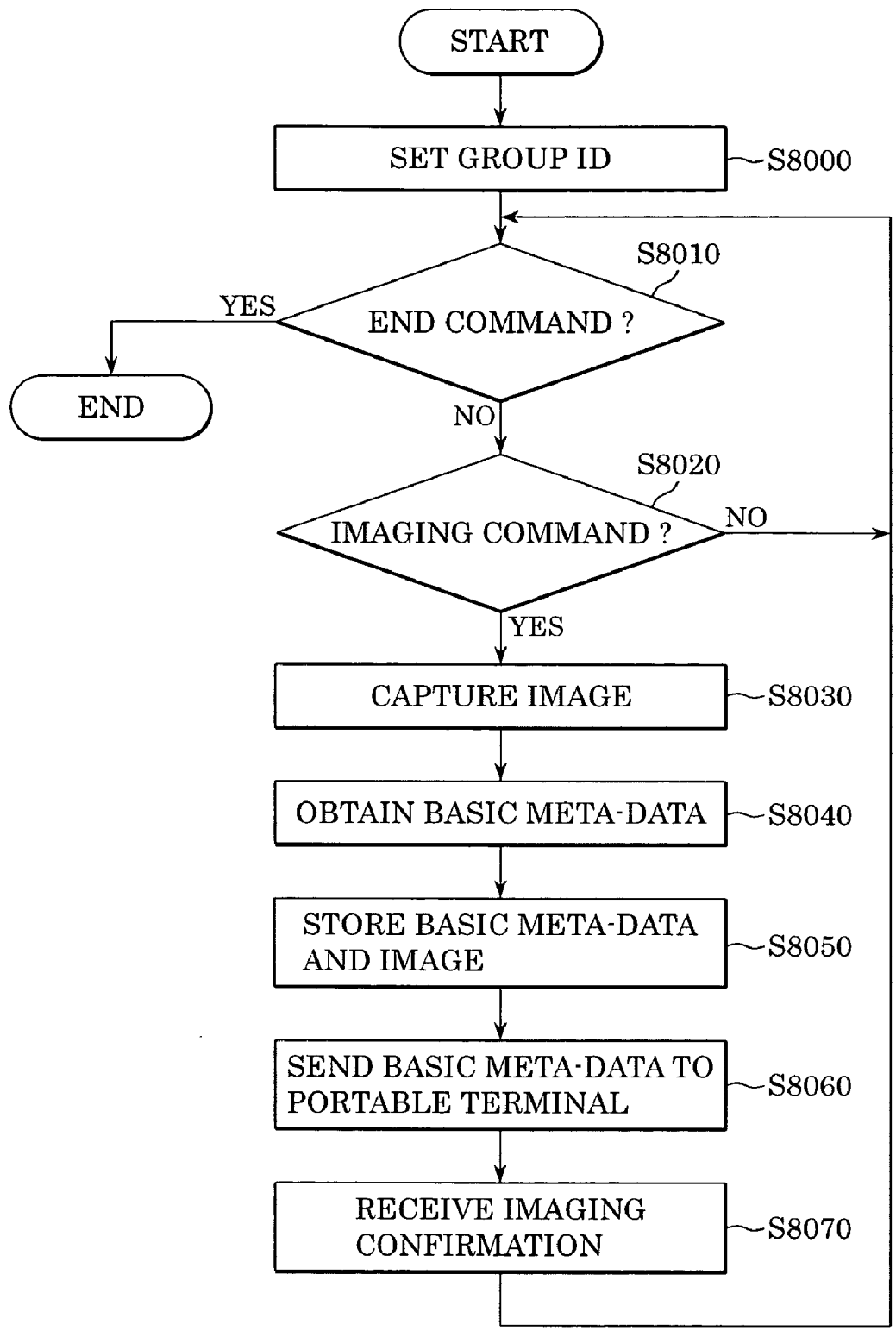
FIG. 8 is a flow chart illustrating the process followed by an imaging apparatus when performing image capturing according to an embodiment of the present invention.

Details of the processes concerning the imaging apparatus and the portable terminal when capturing an image will be described below. FIG. 8 is a flow chart illustrating the steps in the process for the imaging apparatus when capturing an image.

In Step S8000, a group ID is set. There are various ways to set a group ID, as described above. In this embodiment, however, the group ID is read out from a memory card, which is the external memory 27. Next, in Step S8010, it is determined whether the process is ended. The process is ended when a user commands the end of the process via the input unit 22. If the end of the process is not commanded, the process proceeds to Step S8020 to check whether imaging was commanded. If the user has not input a command for capturing an image via the input unit 22, the process returns to Step S8010. If the user has input a command for capturing an image, the process proceeds to Step S8030 to capture an image (details of capturing an image have already been described above).

In Step S8040, basic meta-data is obtained. The basic meta-data may be obtained through various methods, as described above. In this embodiment, the basic meta-data obtained in this step includes a group ID, a user ID, the time and date when the image was captured, the location where the image was captured, an imaging apparatus ID, and a content ID. The user ID is read out from a memory card, which is the external memory 27. The time and date when the image was captured is measured using a clock, which is the meta-data acquisition unit 24. The location where the image was captured is obtained by measuring the latitude and longitude of the location by a GPS, which is the meta-data acquisition unit 24, and then converting these measurements into a place name according to a place name dictionary stored in the ROM 32 in the system controller 21. The imaging apparatus ID is read out from the ROM 32 in the system controller 21. The content ID is issued by the system controller 21.

In Step S8050, the basic meta-data is linked to the image and stored in the external memory 27. Details of this format will be described below (refer to FIG. 11).

Figure 12:
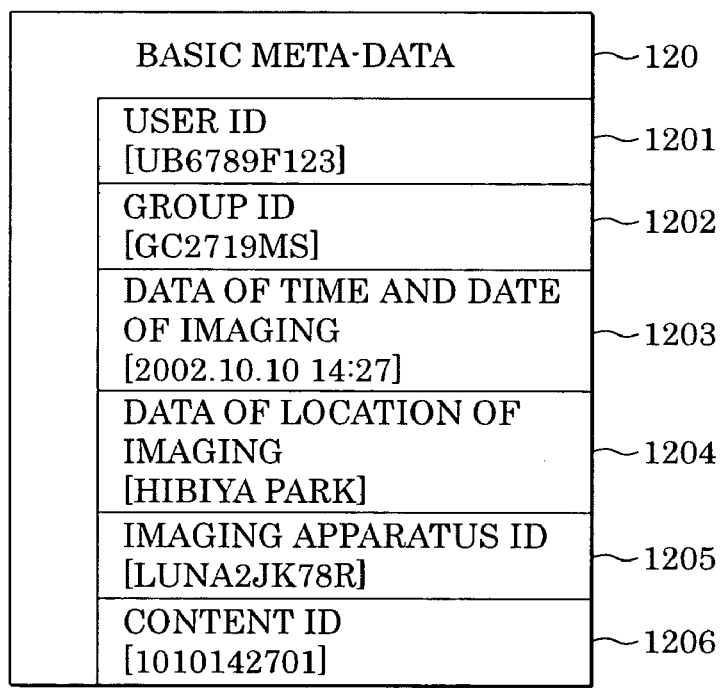
FIG. 12 illustrates an example of the data structure of basic meta-data.

In Step S8060, the basic meta-data is transmitted to the portable terminal. An example of the basic meta-data is illustrated in FIG. 12 and described below. The imaging apparatus ID does not have to be received and transmitted when performing communication since the imaging apparatus and other apparatuses, such as portable terminals, have already exchanged their IDs at the beginning. However, it is important to send the imaging apparatus ID as part of the basic meta-data. Therefore, in this embodiment, the imaging apparatus ID is part of the basic meta-data.

The Steps S8050 and S8060 may be carried out in the opposite order. In other words, after obtaining the basic meta-data in Step S8040, the basic meta-data can be sent to the portable terminal and then the basic meta-data and the image can be stored in the imaging apparatus.

In Step S8070, the imaging apparatus receives, from the portable terminal, the confirmation that an image has been captured. The number of photographees who have been captured in the image (i.e., the number of portable terminals held by the photographees) can be determined according to the number of confirmations received. For example, in FIG. 4, the number of portable terminals is two: one PDA 5 and one cellular phone 6. The basic meta-data is linked to the portable terminals and temporarily stored on the RAM 33.

If the end of the process was not commanded in Step S8010 and imaging was not commanded in Step S8020, the imaging apparatus enters a stand-by mode and repeats Steps S8010 and S8020.

Figure 9:
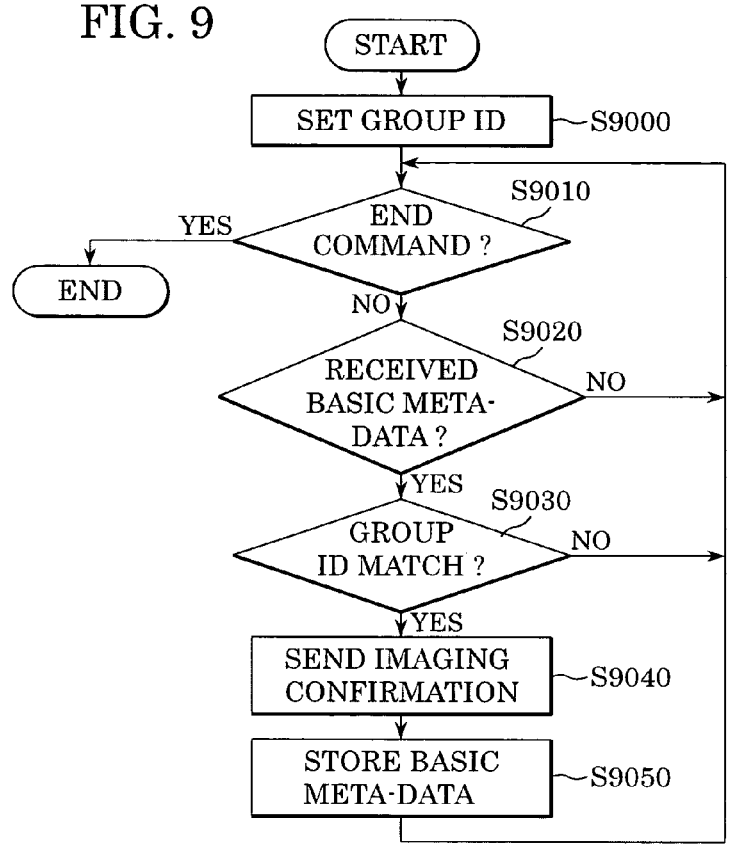
FIG. 9 is a flow chart illustrating the process followed by a portable terminal when performing image capturing according to an embodiment of the present invention.

FIG. 9 is a flow chart illustrating the steps in the process of the portable terminal when capturing an image. In Step S9000, a group ID, which is a data item of the basic meta-data, is set. There are various ways to set a group ID, as described above. In this embodiment, however, the group ID is read out from a memory card, which is the external memory 306, in a similar manner to that for the imaging apparatus.

In Step S9010, it is determined whether the process is ended. The process is ended when a user commands the end of the process via the input unit 304. If the end of the process is not commanded, the process proceeds to Step S9020. In Step S9020, it is checked whether the basic meta-data was received from the imaging apparatus. If the basic meta-data was received, the process proceeds to Step S9030. In Step S9030, it is checked whether the group ID included in the basic meta-data matches the group ID registered for the portable terminal. In this way, if the portable terminal happens to be within a wireless communication range of another photographer belonging to another group, such as another tour group, and happens to receive basic meta-data not linked to the image captured by the photographer belonging to the same group, which group the basic meta-data belongs to can be identified.

If the group IDs match, the process proceeds to Step S9040 to send the confirmation that an image has been captured in the imaging apparatus. In Step S9050, the basic meta-data is stored in the external memory 306. Steps S9040 and S9050 may be carried out in the opposite order.

If the basic meta-data is not received in Step S9020 or if the group IDs do not match in Step S9030, the process returns to Step S9010. Steps S9010 to S9030 are repeated until each condition is satisfied, and the portable terminal enters a stand-by mode.

Figure 10:
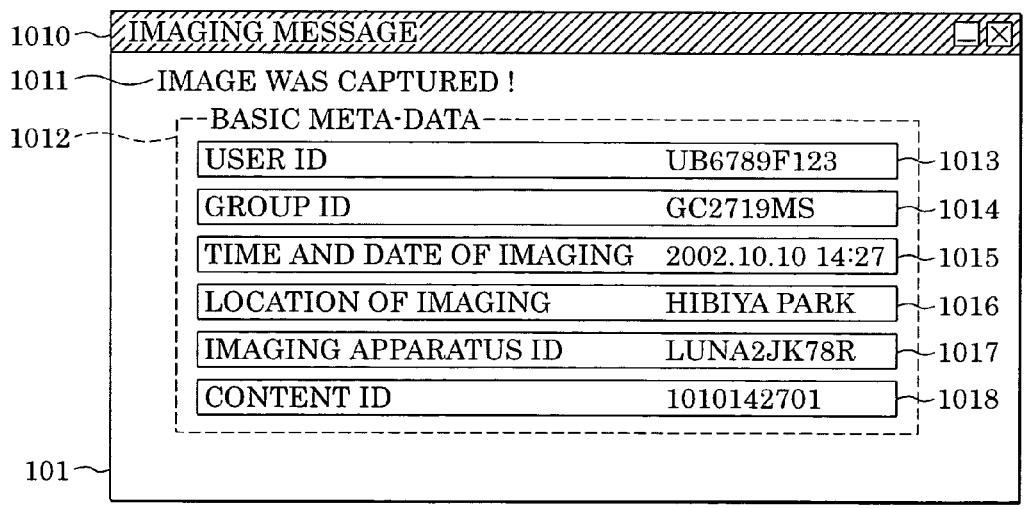
FIG. 10 illustrates an example of a screen shot displayed on a portable terminal held by a photographee when performing image capturing according to an embodiment of the present invention.

FIG. 10 illustrates a screen shot of a display of the portable terminal held by the photographee when an image is captured. A screen 101 notifies the photographee that an image has been captured and displays the basic meta-data. This information is displayed on the screen 101 when the portable terminal receives the basic meta-data from the imaging apparatus and the group ID included in the basic meta-data matches the group ID set for the portable terminal. A title bar 1010 displays the title of the window and is for operating the entire window, such as changing the size of the window. A message 1011 is displayed to notify the user that an image has been captured. An area 1012 is for displaying the basic meta-data and, for example, meta-data items 1013 to 1018 are displayed. A user ID 1013 is for identifying the photographer. A group ID 1014 is for identifying the group including the imaging apparatus and the portable terminal. Other meta-data items are time and date 1015 when the image was captured, a location 1016 where the image was captured, an imaging apparatus ID 1017 for identifying the imaging apparatus, and a content ID 1018 for identifying the image. Not every meta-data item 1013 to 1018 has to be transmitted. As long as the image can be identified among the content data, any combination of the meta-data items may be used. After a predetermined amount of time elapses, the screen 101 is automatically turned off.

Figure 11:
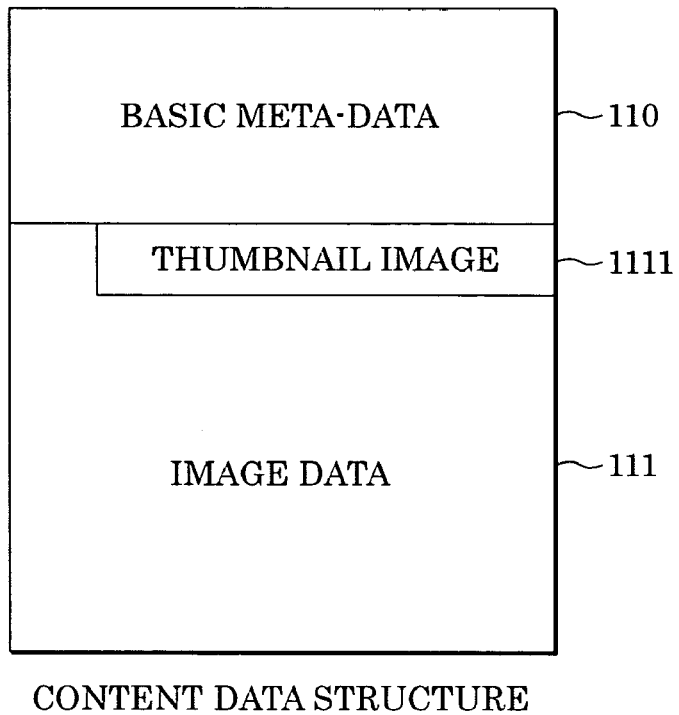
FIG. 11 illustrates an example of a format for storing an image and basic meta-data in association in the imaging apparatus.

FIG. 11 illustrates the format for linking the image and the basic meta-data and storing these in the imaging apparatus.

The image and the basic meta-data are stored in the external memory 27, illustrated in FIG. 1. The data illustrated in FIG. 11 includes basic meta-data 110, image data 111, and a thumbnail 1111 for the image, which is an image obtained by, for example, shrinking the size of the image data 111.

FIG. 12 illustrates the data structure of the basic meta-data 110, illustrated in FIG. 11.

Basic meta-data 120 in FIG. 12 is equivalent to the basic meta-data 110 in FIG. 11. The basic meta-data 120 includes, for example, meta-data items 1201 to 1206. A user ID 1201 is for identifying the photographer. A group ID 1202 is for identifying the group including the imaging apparatus and the portable terminal. Other data items are time and date 1203 when the image was captured, a location 1204 where the image was captured, an imaging apparatus ID 1205 for identifying the imaging apparatus, and a content ID 1206 for identifying the image. Not all of the meta-data items 1201 to 1206 have to be transmitted. As long as the image can be identified among the content data, any combination of the meta-data items may be used.

By adopting the above-described structure, the meta-data can be transmitted independently from the captured image. In this way, a portable terminal having a small memory capacity will be able to receive and store the required information.

Figure 15:
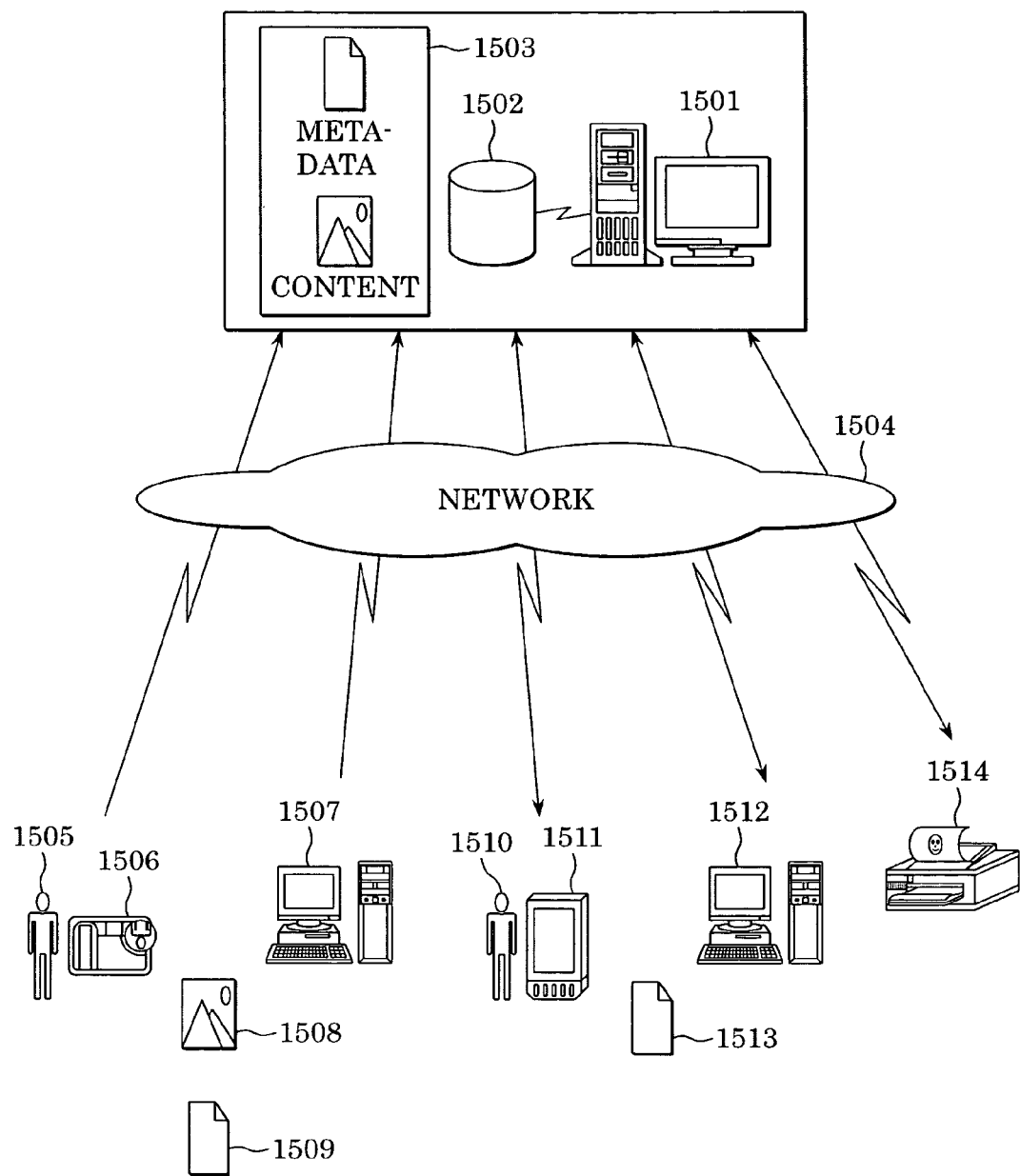
FIG. 15 illustrates an exemplary configuration of a search system according to an embodiment of the present invention.

FIG. 15 illustrates an exemplary configuration of a search system.

A data base (DB) 1502 is connected to a content management server 1501 to store a large amount of content data and meta-data 1503 linked to items of the content data. A photographer 1505 sends an image 1508 and meta-data 1509 linked to the image 1508 stored in an imaging apparatus 1506 to the content management server 1501 via a network 1504, such as the Internet. The imaging apparatus 1506 may be directly connected to the network 1504. Otherwise, the imaging apparatus 1506 may be connected to a personal computer (PC) 1507 that is connected to the network 1504 so that the image 1508 and the meta-data 1509 are first sent to the PC 1507 and then sent out from the PC 1507. The image 1508 is linked to the meta-data 1509. The meta-data 1509 includes basic meta-data. The basic meta-data may be inserted into the image data file including a thumbnail or may be a separate file. The content management server 1501 registers the received image 1508 and the meta-data 1509 in the DB 1502.

A photographee 1510 conducts a search based on the meta-data stored on a portable terminal 1511. The portable terminal 1511 may be directly connected to the network 1504, and then a search may be conducted through the portable terminal 1511. Instead, the portable terminal 1511 may be connected to a personal computer 1512 to transfer the meta-data onto the personal computer 1512. Then, a search may be conducted through the personal computer 1512. The meta-data 1513 includes basic meta-data, whose details have been described above with reference to FIG. 12. The basic meta-data input by a user may be partially or entirely sent to the content management server 1501 as a search condition. The content management server 1501 finds an image linked to meta-data matching the search condition and sends this back to the portable terminal 1511 possessed by the photographee 1510 or to the personal computer 1512. The image found through the search may be used in various ways, such as outputting it via a printer 1514, sending it to a friend, or downloading it to privately enjoy it. By adopting the structure described above, a search using meta-data may be easily conducted.

Figure 16:
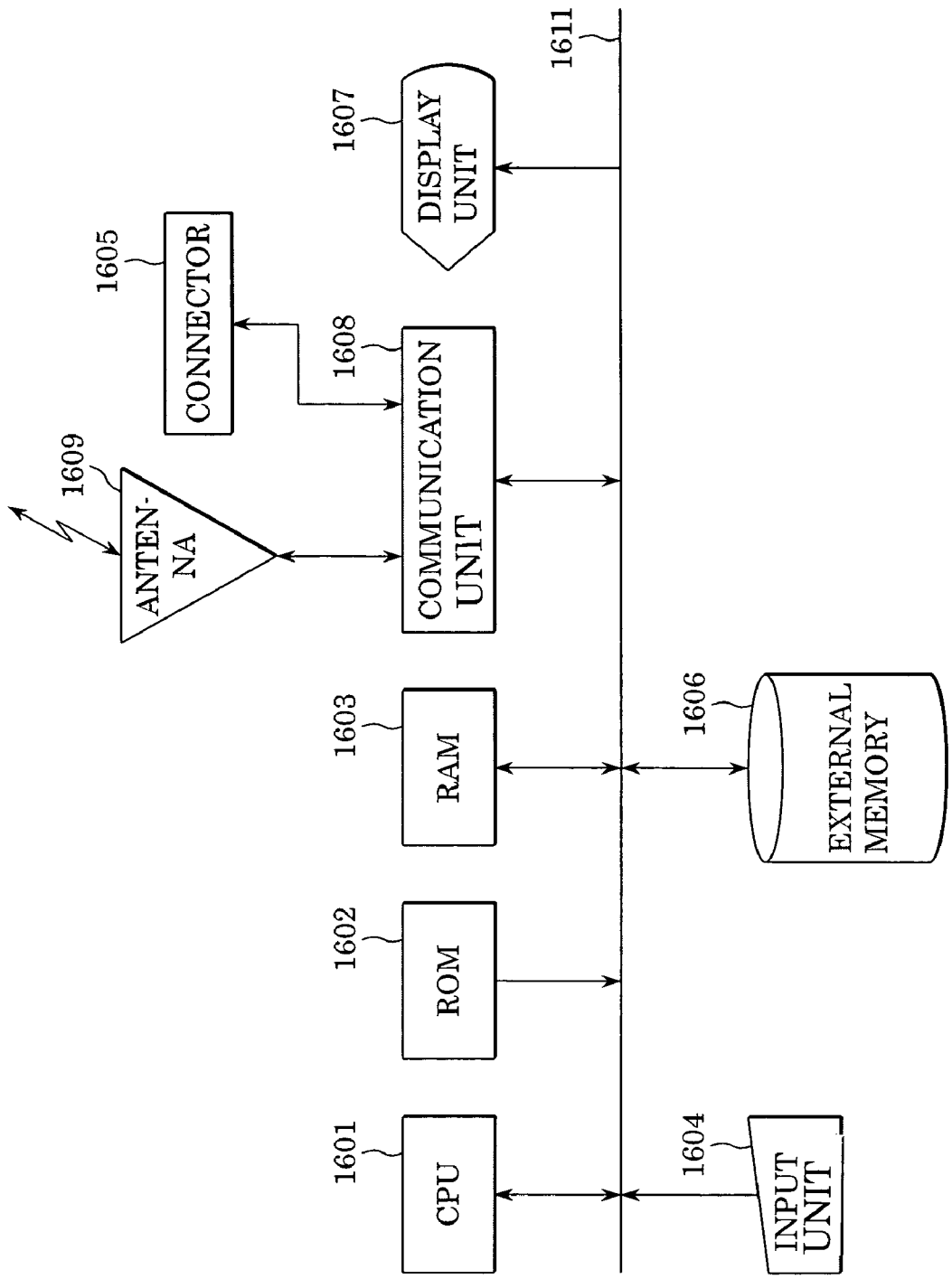
FIG. 16 is a block diagram of a content management server according to an embodiment of the present invention.

FIG. 16 illustrates the control structure of the content management server 1501. The components 1601 to 1611 are basically the same as the components 301 to 311, respectively, in FIG. 3. However, the external memory 1606 is constituted of a storage medium having a sufficient capacity for storing a large amount of content data linked to meta-data. An input unit 1604 and a display unit 1607 are required for maintenance only and do not necessarily have to be provided as a single unit. Instead, an input unit and/or a display unit connected to a network may be used.

Figure 17A:
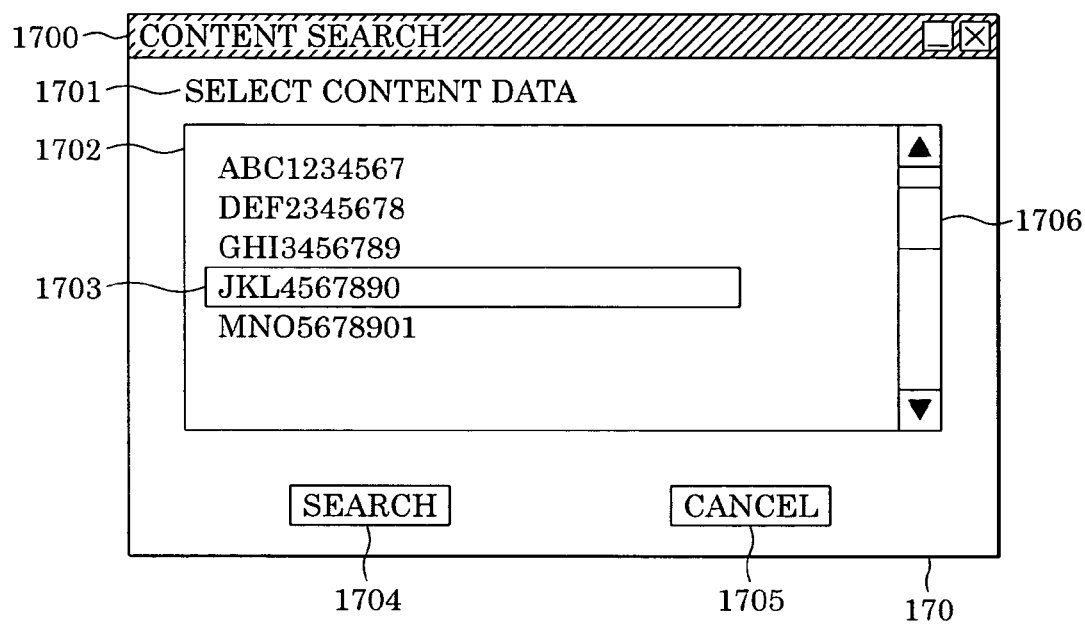
FIGS. 17A and 17B illustrate an example of a search condition input screen for conducting a search based on basic meta-data.
Figure 17B:
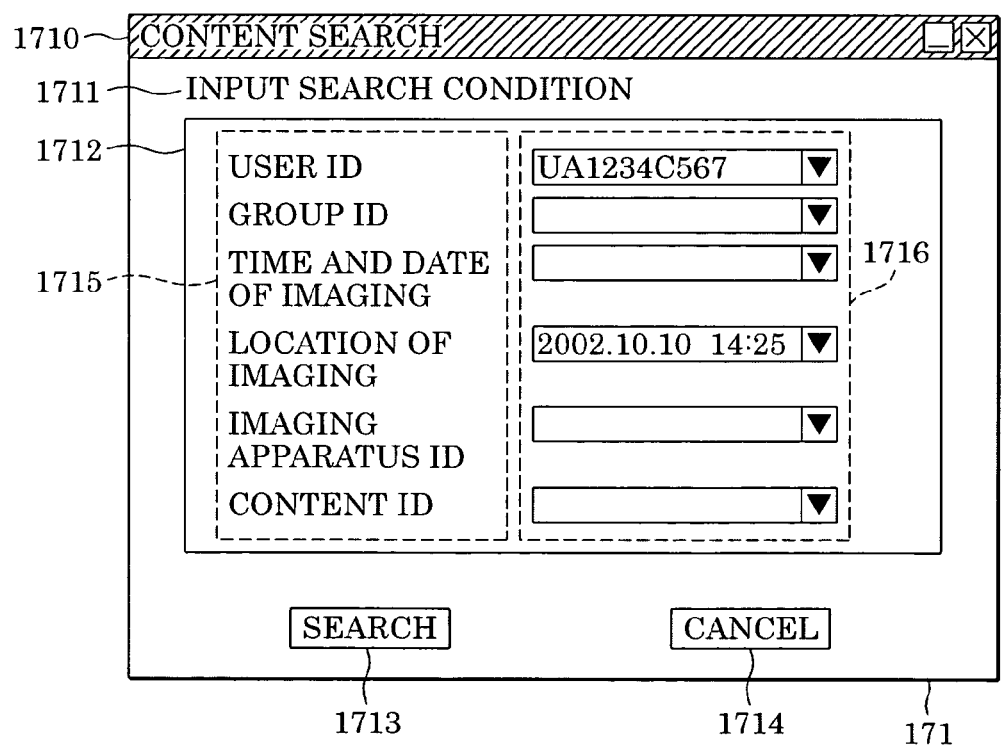

FIGS. 17A and 17B illustrate search condition input screens for conducting a search based on basic meta-data. A photographee can search the content data stored on the content management server 1501 through display screens 170 and 171 of a portable terminal or a personal computer connected to a network. The screen may be selected according to the search. For example, if the desired content data is already known, the screen 170 may be selected; whereas, if the desired content data is not exactly known, the screen 171 may be selected. The screens 170 and 171 are displayed when using a window system of a specific application. When the windows system is applied to a smaller display, for example, of a cellular phone, the screens 170 and 171 can be changed to correspond to the size of the display. The same function may also be provided through the use of a web browser.

The screen 170 includes a title bar 1700 for displaying the title of the window and for operating the entire window, such as changing the size of the window. A message 1701 for urging a user to carry out an operation is displayed on the screen 170. In this case, the displayed message is "Select Content Data."

A list box 1702 is provided to display a list of the items of the content data, such as the basic meta-data, stored in the portable terminal or personal computer. The character strings, such as "ABC1234567" and "DEF2345678," included in the list are unique for each of the items of the content data (refer to FIG. 12), e.g., items of the basic meta-data, stored in the portable terminal or the personal computer. The data items represented by unique character strings can be identified by the imaging apparatus IDs and the content IDs for the imaging apparatus included in the basic meta-data.

A rectangular area 1703 surrounded by a heavy line indicates that that item of the content data is selected. In this case, the content data item represented by the character string "JKL4567890" is selected. After selecting a content data item and clicking on a SEARCH button 1704, the basic meta-data of the content data item corresponding to the selected character string is sent to the content management server 1501 as a search condition. At the content management server 1501, a content data item matching the search condition will be searched for. A CANCEL button 1705 may be clicked to terminate the search. When there are many content data items in the list, a scroll bar 1706 may be operated using the input unit 310, illustrated in FIG. 3, to scroll through the list to display the character string representing the desired content data item.

The screen 171 includes a title bar 1710 for displaying the title of the window and for operating the entire window, such as changing the size of the window. A message 1711 for urging a user to carry out an operation is displayed. In this case, the displayed message is "Input Search Condition." An area 1712 is used to assign a search condition and includes search items 1715 in the rectangular area surrounded by a dotted line and combo boxes 1716 in another rectangular area surrounded by a dotted line. After specifying a search condition and clicking on a SEARCH button 1713, the specific search condition is sent to the content management server 1501. At the content management server 1501, a content data item that matches the search condition is searched for. A CANCEL button 1714 may be clicked to terminate the search.

The area 1715 includes items of the basic meta-data (refer to FIG. 12), e.g., a user ID for identifying the photographer, a group ID for identifying the group of the imaging apparatus and the portable terminal, time and date when the image was captured, the location where the image was captured, an imaging apparatus ID for identifying the imaging apparatus used for capturing the image, and information for identifying the image. These basic meta-data items are sent from the imaging apparatus to the portable terminal when an image is captured. Combo boxes 1716 are provided for the basic meta-data items. Through the combo boxes 1716, details of basic meta-data items may be input as search conditions or the basic meta-data items (equivalent to the basic meta-data 120 in FIG. 12) stored in the portable terminal or the personal computer may be selected from a pull-down list. Not all of the basic meta-data items have to be selected. Instead, a combination of items may be selected. In this case, the user ID "UA1234C567" and the time and date "2002.10.10 14:25" are selected as search conditions. A content data item can be uniquely identified by the imaging apparatus ID and the content ID. Therefore, by selecting these two items from other basic meta-data items, the one content data item that corresponds to the search conditions can be found.

The operation of the content management server 1501 illustrated in FIG. 15 for conducting a search on the content data stored in the DB 1502 based on meta-data linked to content data items will be described below.

A search is conducted according to search conditions provided by a user. The search conditions and the meta-data added to each content data item are compared. Then, a content data item linked to the meta-data matching the search conditions is selected by using index information.

First, data is processed in the RAM 1603, illustrated in FIG. 16, so that the content management server 1501 can utilize the index information for a search. The enormous amount of content data and meta-data subjected to a search are stored in an external memory 1606, illustrated in FIG. 16. Then, the content management server 1501 receives the search conditions, which have been input by a user, from the portable terminal or the personal computer. The method for inputting search conditions is as described above with reference to FIGS. 17A and 17B. The content management server 1501 analyzes the received search conditions to generate a query for conducting the actual search. Then, the query and the meta-data linked to the content data are compared to find a match. Even if the match is not complete, a combination of meta-data items corresponding to the desired content data that is similar to the query may be listed as possible search results in the order of higher similarity. When there is a matching search result, the meta-data of the found content (refer to FIG. 12), the image file name, and the thumbnail are sent to the portable terminal or the personal computer. If there are no matching search results, notification of the fact that no results were found will be sent to the portable terminal or the personal computer.

Figure 18:
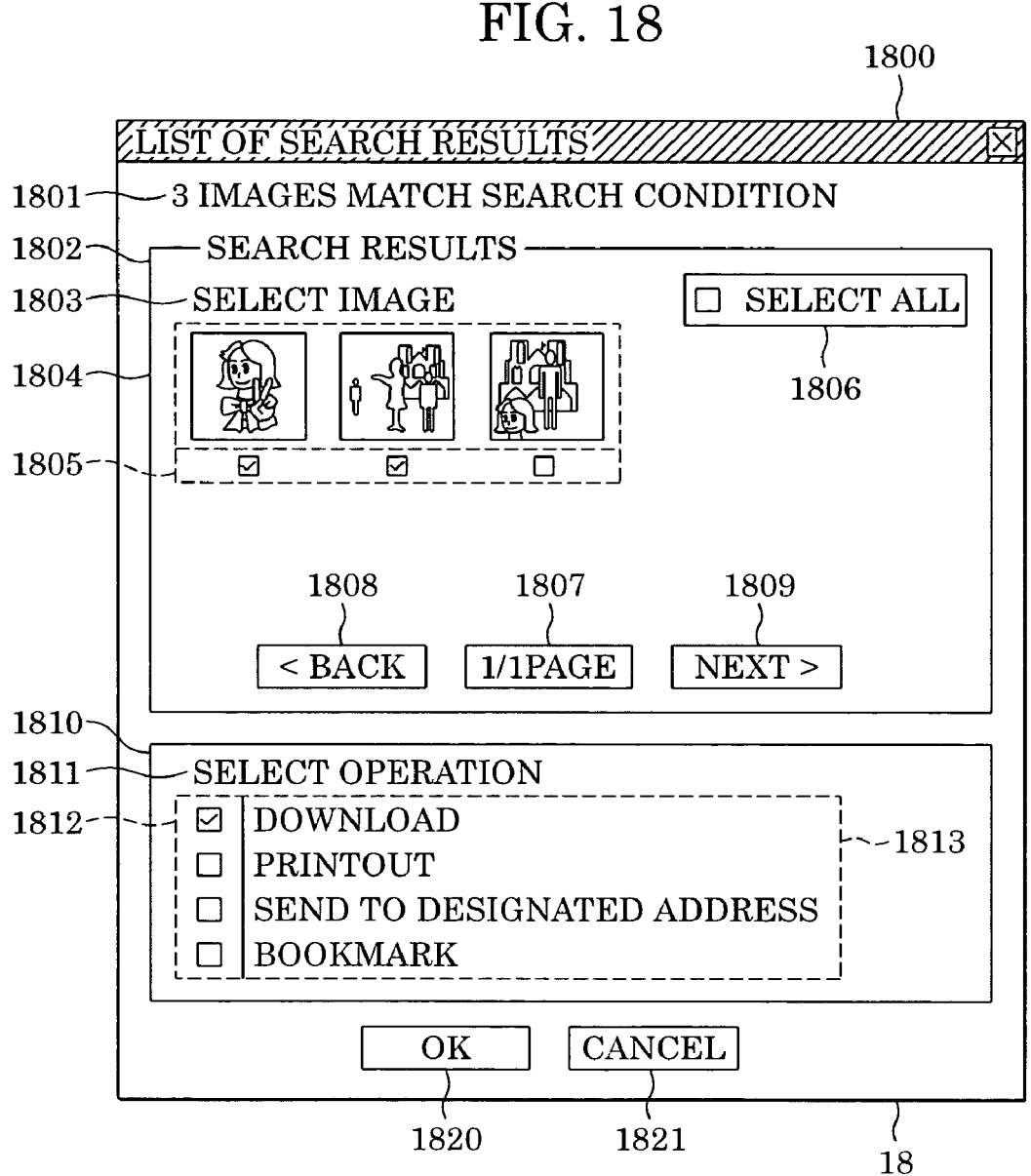
FIG. 18 illustrates an example of a screen shot displaying a list of search results.

FIG. 18 illustrates a screen displaying a list of search results. This screen displays the results of a search conducted based on the search conditions illustrated in the screen 171 of FIG. 17B. When the portable terminal or personal computer receives the meta-data (refer to FIG. 10), the image file name, and the thumbnail of the content data matching the search conditions as a search result, a display screen 18 is displayed at the portable terminal or the personal computer.

A title bar 1800 displays the title of the window and is for operating the entire window, such as changing the size of the window. A message 1801 is sent to a user. In this case, the displayed message is "3 Images Match Search Condition." An area 1802 is for displaying the search results. A message 1803 urging a user to carry out an operation is displayed. In this case, the displayed message is "Select Image." A rectangular area 1804 surrounded by a dotted line denotes an area where thumbnails for the content data items matching the search conditions are displayed. In this case, three thumbnails are displayed as a result of the search.

Check boxes 1805 are for selecting whether or not to use each content data item. A check box 1806 is for selecting all content data items displayed on the screen. An area 1807 shows which page the screen is currently displaying in accordance with the number of pages covering all of the search results. A button 1808 is for displaying the previous page. A button 1809 is for displaying the next page.

An area 1810 is for selecting how to use the content data items selected in area 1802. A message 1811 is sent to a user. In this case, the displayed message is "Select Operation." A rectangular area 1812 surrounded by a dotted line includes check boxes for selecting the operations listed.

A rectangular area 1813 surrounded by a dotted line includes a list of operations. In this case, four operations are listed: "download," "printout," "send to designated address," and "bookmark." When "download" is selected, the actual image data of the captured image can be downloaded onto the portable terminal or the personal computer. When "printout" is selected, print services provided at, for example, a photo print shop can be used. When "send to designated address" is selected, people, such as friends and family, can be notified that an image is available to see. When "bookmark" is selected, search results can be stored on the content management server 1501, a portable terminal or a personal computer so that the image can be used later. When an OK button 1820 is clicked, an instructional screen in accordance with the operation selected in the area 1810 is displayed. For example, when "download" is selected, a screen for selecting the destination of the downloaded file appears. When the OK button 1820 is clicked after "printout" is selected, a screen for selecting the number of printouts, the address to which to send the printouts, and the payment method is displayed. When the OK button 1820 is clicked after "send to designated address" is selected, a screen for selecting the address for delivering the image is displayed. By clicking a CANCEL button 1821, the operation can be terminated.

By adopting the above-described structure, the photographer does not have to send the image data to the photographee, but only has to upload the image data to a network. The photographee can search for the desired image data and obtain the image.

Second Embodiment

In the first embodiment, after receiving the basic meta-data from the imaging apparatus, the portable terminals confirm whether the group IDs included in the basic meta-data are the same as the group IDs pre-registered for the portable terminals possessed by the photographees 2 and 3. If the group IDs are the same, the portable terminals send back a confirmation notifying that an image was captured in the imaging apparatus. However, the present invention is not limited to this and may be structured so that personal meta-data stored in the portable terminals is sent back in addition to confirmation being captured. Personal meta-data is information concerning the photographee possessing the portable terminal and includes the name of the photographee, home address, home telephone number, home facsimile number, E-mail address, URL of a personal web site, place of work, office telephone number, office facsimile number, office E-mail address, and URL of office.

The operation of sending personal meta-data from a portable terminal to an imaging apparatus will be described with reference to FIG. 21. The components 2100 to 2130 in FIG. 21 are the same as the components 7000 to 7030, respectively, in FIG. 7, so their descriptions are omitted.

Figure 21:
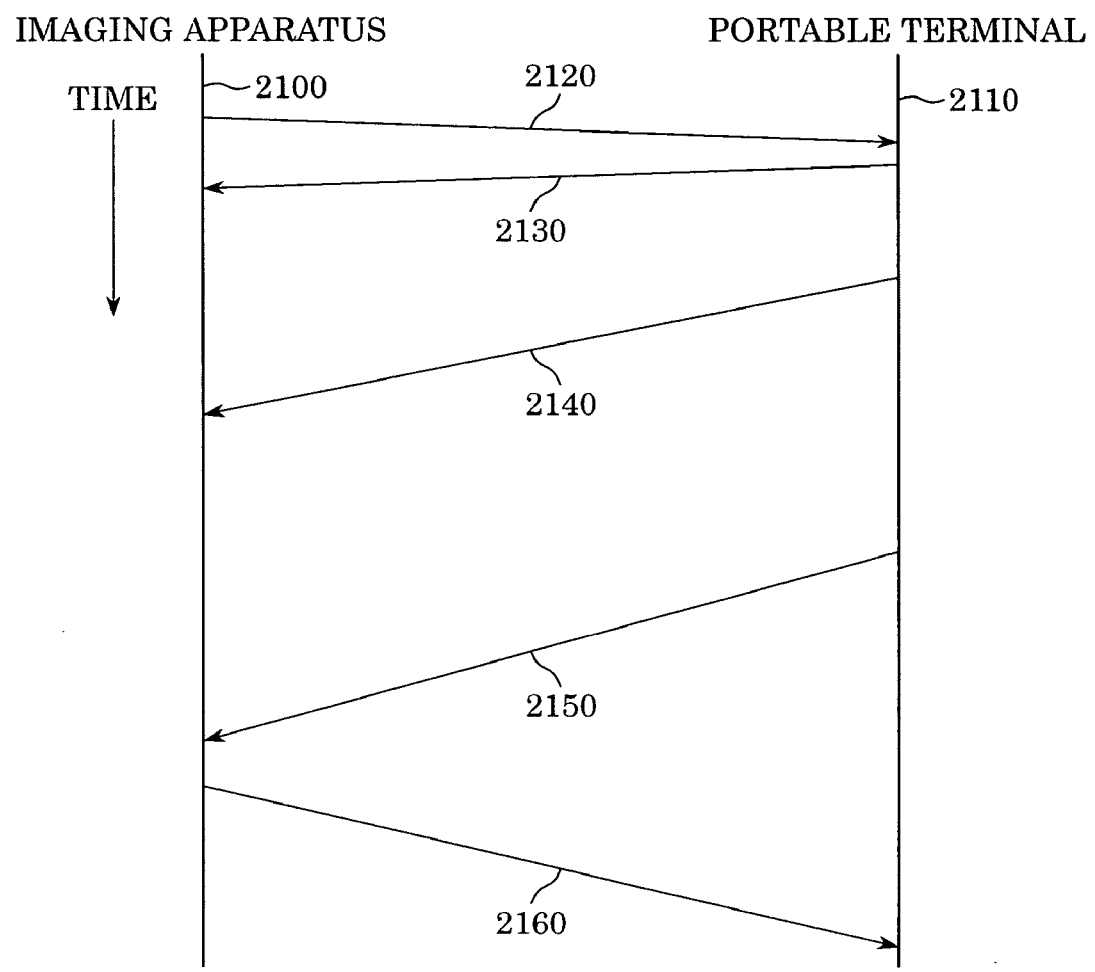
FIG. 21 illustrates an example of data exchange between an imaging apparatus and a portable terminal when performing image capturing according to another embodiment of the present invention.

After the portable terminal returns a confirmation, represented by an arrow 2130, notifying that an image has been captured, the personal meta-data stored in the portable terminal is linked to an imaging apparatus ID and a content ID of the imaging apparatus included in the basic meta-data and is sent to the imaging apparatus (refer to arrows 2140 and 2150 in FIG. 21). The timing of transmission may be any timing that is possible for the portable terminals. For example, the transmission timing may be the same as the timing for sending a confirmation. The imaging apparatus links the image to the basic meta-data and the personal meta-data and stores the data.

After the imaging apparatus confirms that personal meta-data has been sent from both portable terminals, a PDA 5 and a cellular phone 6, the personal meta-data sent from the PDA 5 and the personal meta-data sent from the cellular phone 6 are combined into one collection of personal meta-data. The collection of personal meta-data is linked to the imaging apparatus ID and the content ID of the imaging apparatus included in the basic meta-data and is sent to the PDA 5 and the cellular phone 6 (refer to the arrow 2160 in FIG. 21).

The wireless communication used to send the personal meta-data from the portable terminal to the imaging apparatus may or may not have directivity since it does not significantly affect the user. This is because the imaging apparatus can determine whether the portable terminal is the portable terminal that the imaging apparatus had sent basic meta-data to since the portable terminal links its personal meta-data to the received basic meta-data and sends this to the imaging apparatus. Accordingly, similar to the first embodiment, the wireless communication used for sending data from the portable terminal to the imaging apparatus may or may not have directivity.

Figure 22:
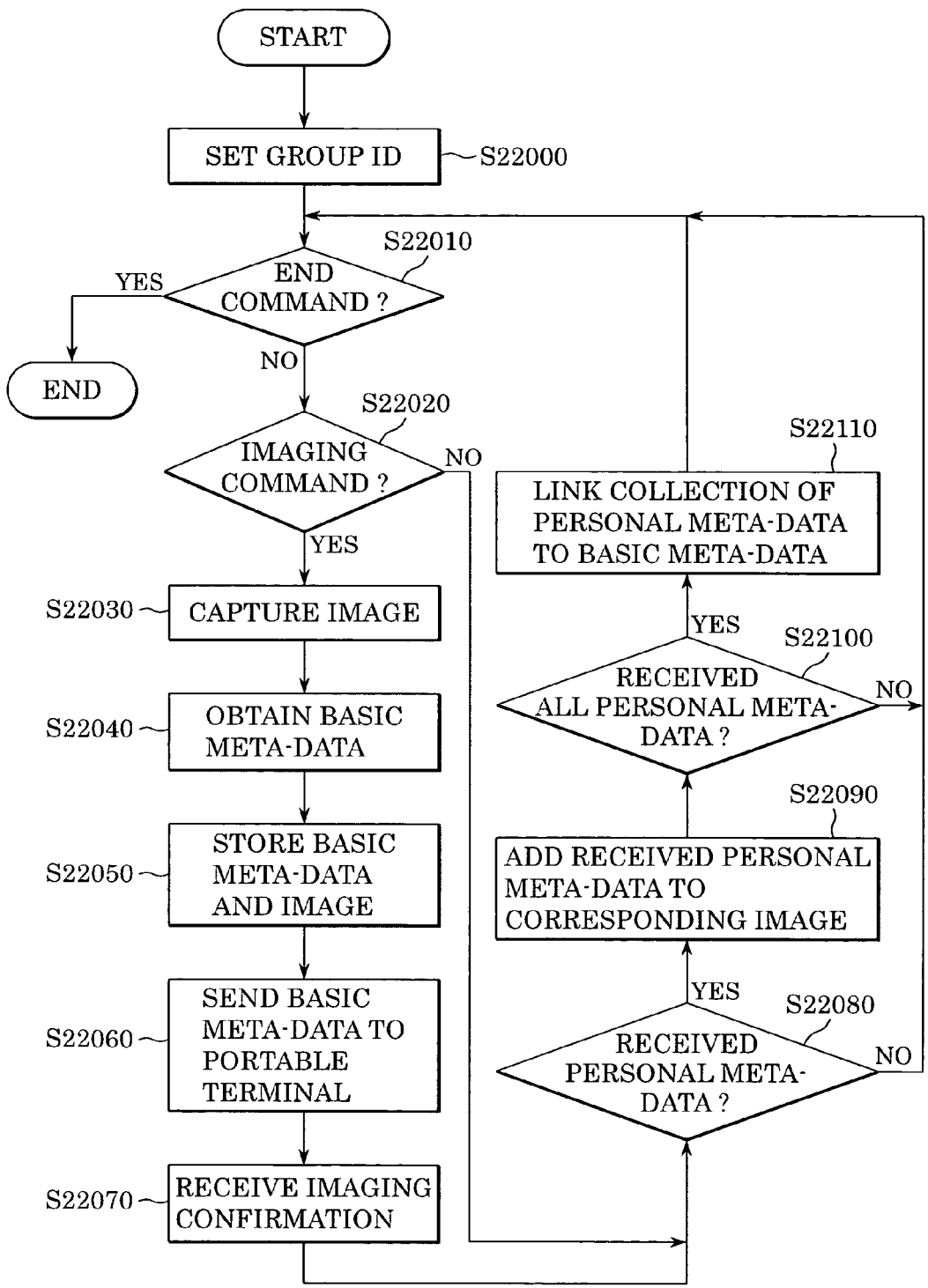
FIG. 22 is a flow chart illustrating the process followed by an imaging apparatus when performing image capturing according to another embodiment of the present invention.

The processes carried out for the imaging apparatus and the portable terminal when capturing an image will be described below. FIG. 22 is a flow chart illustrating the steps in the process carried out for the imaging apparatus when capturing an image.

In Step S22000, a group ID is set for the imaging apparatus. There are various ways to set a group ID, as described above. In this embodiment, similar to the first embodiment, the group ID is read out from a memory card, which is the external memory 27. Next, in Step S22010, it is determined whether the process is ended. The process is ended when a user commands the end of the process via the input unit 22. If the end of the process is not commanded, the process proceeds to Step S22020 to check whether imaging was commanded. If the user has not input a command for capturing an image via the input unit 22, the process proceeds to Step S22080 (details will be described below). If the user has input a command for capturing an image, the process proceeds to Step S22030 to capture an image.

In Step S22040, basic meta-data is obtained. The basic meta-data may be obtained through various methods. In this embodiment, similar to the first embodiment, the basic meta-data obtained in this step includes a user ID, the time and date when the image was captured, the location where the image was captured, an imaging apparatus ID, and a content ID. The user ID is read out from a memory card, which is the external memory 27. The time and date when the image was captured is measured using a clock, which is the meta-data acquisition unit 24. The location where the image was captured is obtained by measuring the latitude and longitude of the location by a GPS, which is the meta-data acquisition unit 24, and then converting these measurements into a place name according to a place name dictionary stored in the ROM 32 in the system controller 21. The imaging apparatus ID is read out from the ROM 32 in the system controller 21. The content ID is issued by the system controller 21.

In Step S22050, the basic meta-data is linked to the image and stored in the external memory 27. In Step S22060, the basic meta-data is sent to the portable terminal. Steps S22050 and S22060 may be carried out in the opposite order.

In Step S22070, confirmation of imaging sent from the portable terminal is received. The number of photographees who have been captured in the image (i.e., the number of portable terminals held by the photographees) can be determined based on the number of confirmations received. The basic meta-data is linked to number of the portable terminals and temporarily stored in the RAM 33.

In Step S22080, it is checked whether personal meta-data was received from the portable terminal. If personal meta-data was received, the imaging apparatus ID and the content ID in the imaging apparatus are referred to in Step S22090 to confirm that (the basic meta-data of) the corresponding image includes personal meta-data, and the received personal meta-data is added to the corresponding image as its basic meta-data (refer to FIG. 25. Details will be described later). If personal meta-data was not received, Steps S22090 to 22110 are skipped and the process returns to Step S22010.

In Step S22100, it is checked whether all of the items of the personal meta-data linked to the image have been received. This can be checked by comparing the number of portable terminals linked to the basic meta-data and temporarily stored in Step S22070 and the number of personal meta-data items received in Step S22090. If all of the items of the personal meta-data linked to the image have been received, the process proceeds to Step S22110 and all of the personal meta-data items are combined into one collection. The collection of personal meta-data is linked to the basic meta-data (refer to FIG. 25 which will be described later).

At this time, the collection of personal meta-data is linked to the imaging apparatus ID and the content ID of the imaging apparatus included in the basic meta-data so that the portable terminal can identify the imaging apparatus as the imaging apparatus that had been communicating with the portable terminal. Unless the collection of personal meta-data is linked to the imaging apparatus ID and the content ID, the portable terminal will not be able to distinguish between the personal meta-data of other photographees and the personal meta-data of non-photographees. Moreover, the collection of personal meta-data will not correspond to the basic meta-data stored in the portable terminal, and thus, no more additional items will be allowed to be received.

If the personal meta-data for all photographees is not received in Step S22100, Step S22110 is skipped and the process returns to Step S22010.

If the end of the process was not commanded in Step S22010 and imaging was not commanded in Step S22020, the imaging apparatus enters a stand-by mode and repeats Steps S22010, S22020, and S22080.

Figure 23:
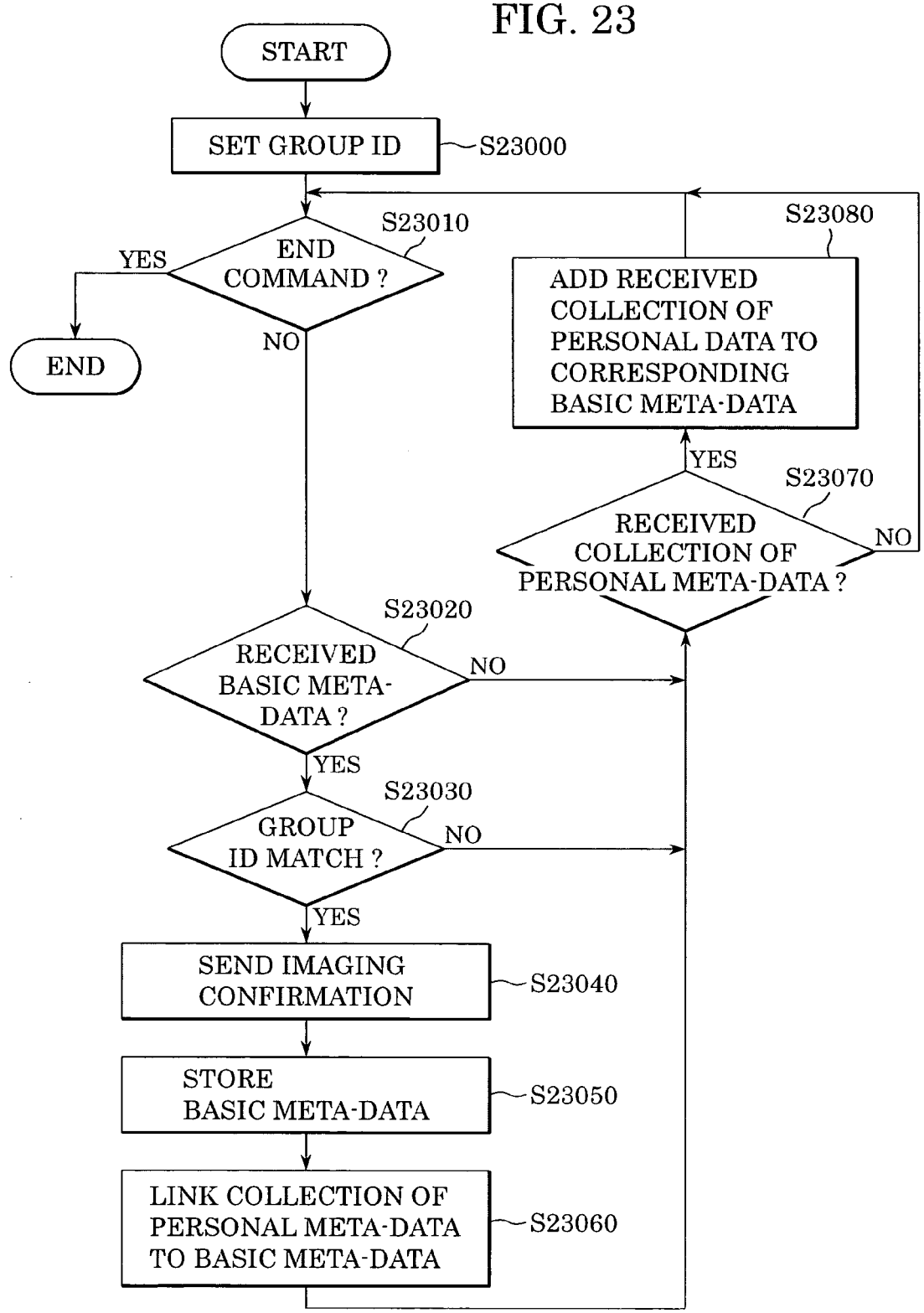
FIG. 23 is a flow chart illustrating the process followed by a portable terminal when performing image capturing according to another embodiment of the present invention.

FIG. 23 is a flow chart illustrating the steps in the process carried out for the portable terminal when capturing an image. In Step S23000, a group ID is set. In this embodiment, the group ID is read out from a memory card, which is the external memory 306, in a similar manner to that for the imaging apparatus. In Step S23010, it is determined whether the process is ended. The process is ended when a user commands the end of the process via the input unit 304. If the end of the process is not commanded, the process proceeds to Step S23020. In Step S23020, it is checked whether the basic meta-data was received from the imaging apparatus. If the basic meta-data was received, the process proceeds to Step S23030. In Step S23030, it is checked whether the group ID included in the basic meta-data matches the group ID registered for the portable terminal. In this way, if the portable terminal happens to be within a wireless communication range of another photographer belonging to another group, such as another tour group, and happens to receive basic meta-data not linked to the image captured by the photographer belonging to the same group, the group to which the basic meta-data belongs can be identified.

If the group ID matches, the process proceeds to Step S23040 to transmit a confirmation notifying that an image has been captured. In Step S23050, the basic meta-data is stored in the external memory 306.

In Step S23060, personal meta-data is sent to the imaging apparatus (refer to FIG. 25 described below). This portable terminal possesses personal meta-data for only one photographee. At this time, the personal meta-data is linked to the portable terminal ID and the content ID of the imaging apparatus of the basic meta-data so that the imaging apparatus can identify the imaging apparatus as being the portable terminal that had been communicating with the imaging apparatus. Unless the personal meta-data is linked to the imaging apparatus ID and the content ID, the imaging apparatus will not be able to distinguish between the personal meta-data from a portable terminal that has been captured in the image and personal meta-data from a portable terminal that has not been captured in the image. Moreover, the personal meta-data will not correspond to the basic meta-data stored in the imaging apparatus, and thus, no more additional items will be allowed to be received. As described above, personal meta-data may include various items. In this embodiment, personal meta-data includes the name of the photographee, home address, home telephone number, home facsimile number, place of work, and office telephone number. Personal meta-data is registered in the portable terminal in advance. The methods for registering personal meta-data are the same as the methods for registering the group ID of the imaging apparatus.

In Step S23070, it is checked whether the portable terminal received the collection of personal meta-data combined by the imaging apparatus.

If the collection of personal meta-data is received, in Step S23080, the received personal meta-data is added to the basic meta-data corresponding to the imaging apparatus ID and the content ID in the imaging apparatus. At this time, in addition to the personal meta-data of the other photographees captured in the same image, the personal data originally stored in this portable terminal will also be added. In this way, the data becomes redundant. In order to avoid this redundancy, the original personal meta-data may be matched with the collection of personal meta-data. Then, the original meta-data can be deleted before adding the collection of personal meta-data.

If the basic meta-data is not received in Step S23020, if the group IDs do not match in Step S23030, or if the collection of personal meta-data is not received in Step S23070, the process returns to Step S23010. Unless each condition is met, Steps S23010 to S23030 and Step S23070 are repeated, and the portable terminal enters a stand-by mode.

Figure 24A:
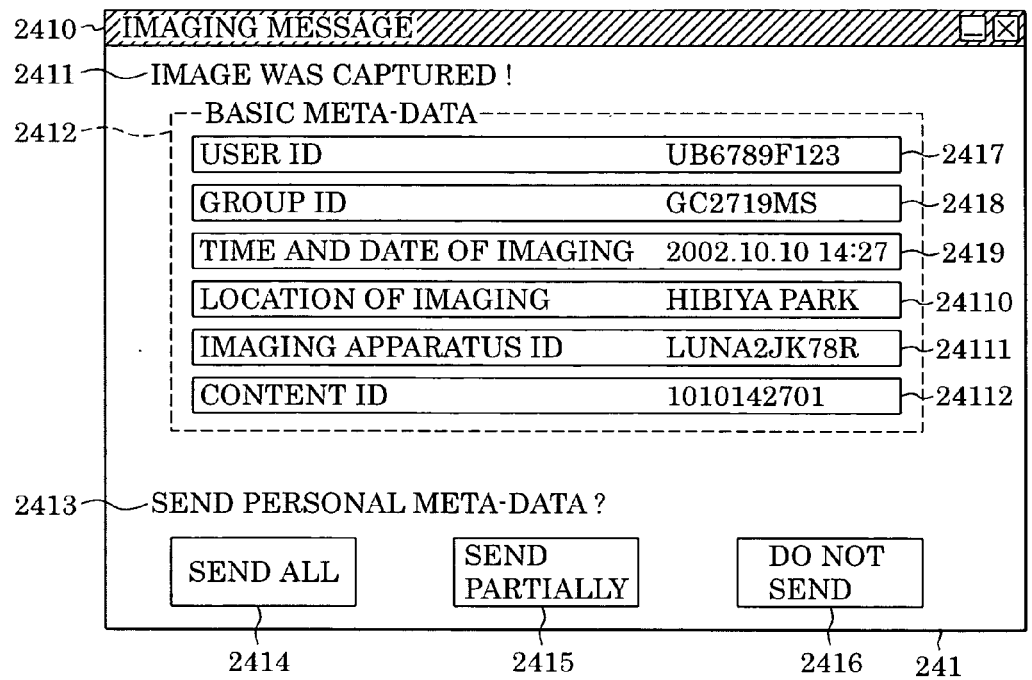
FIGS. 24A and 24B illustrate an example of screen displays displayed on a portable terminal held by a photographee when performing image capturing according to another embodiment of the present invention.
Figure 24B:
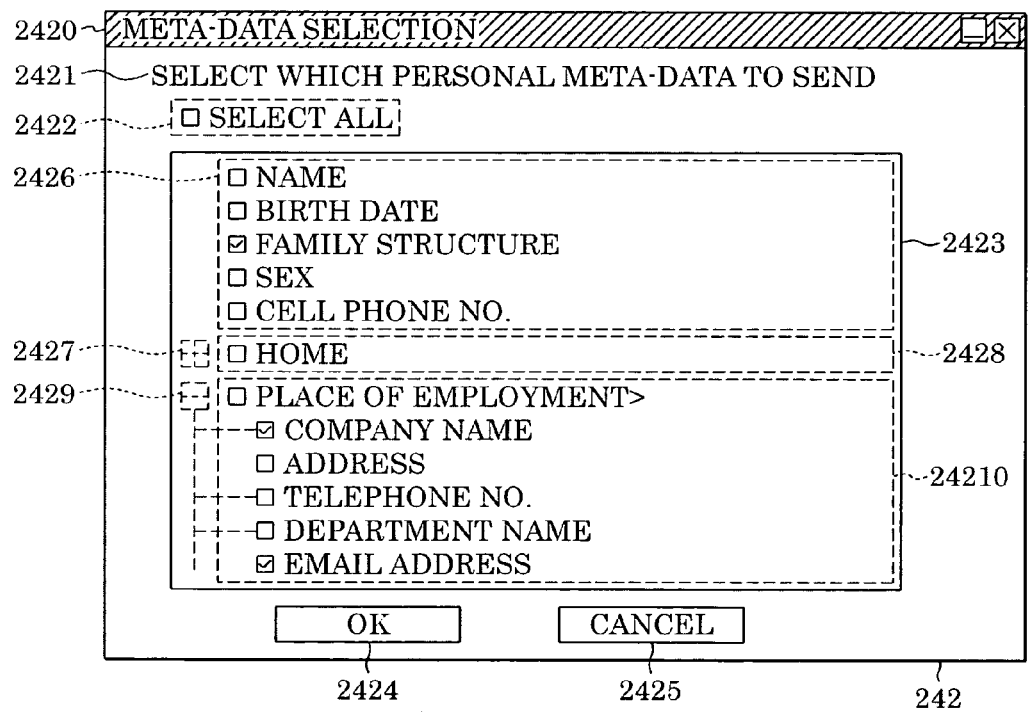

FIGS. 24A and 24B illustrate screen displays displayed on a portable terminal held by a photographee when capturing an image.

A screen 241 displays a notice to the photographee indicating that an image has been captured and displays basic meta-data. The screen 241 is displayed when the portable terminal receives the basic meta-data from the imaging apparatus and the group ID included in the basic meta-data matches the group ID registered for the portable terminal. A title bar 2410 displays the title of the window and is for operating the entire window, such as changing the size of the window. A message 2411 is displayed to notify the user that an image has been captured. An area 2412 is for displaying the basic meta-data and, for example, items 2417 to 24112 of the basic meta-data are displayed. A user ID 2417 is for identifying the photographer. A group ID 2418 is for identifying the group that includes the imaging apparatus and the portable terminal. Other data items are time and date 2419 when the image was captured, a location 24110 where the image was captured, an imaging apparatus ID 24111 for identifying the imaging apparatus, and a content ID 24112 for identifying the image. Not all of the basic meta-data items 2417 to 24112 have to be transmitted. As long as the image can be identified, any combination of basic meta-data items can be used.

A message 2413 is for asking the user whether or not to send personal meta-data. A SEND ALL button 2414 is for giving permission to send every pre-selected item of the personal meta-data. When the SEND ALL button 2414 is clicked, every pre-selected personal meta-data item is sent to the imaging apparatus. A SEND PARTIALLY button 2415 is for giving permission to send some of the personal meta-data items selected by the user each time an image is captured. When the SEND PARTIALLY button 2415 is clicked, a personal meta-data item selection screen 242 is displayed. A DO NOT SEND button 2416 is for refusing to send the personal meta-data items. When the DO NOT SEND button 2416 is clicked, the screen 241 is turned off.

A screen 242 is for selecting the personal meta-data items to be sent to the imaging apparatus. When sending personal meta-data from the portable terminal to the imaging apparatus after an image is captured, the entire personal information stored in the portable terminal may be sent or certain items of the personal information to be sent may be selected by the photographee each time an image is captured. In this way, the photographee's privacy is more safely protected.

A title bar 2420 displays the title of the window and is for operating the entire window, such as changing the size of the window. A message 2421 is for urging a user to select the personal meta-data items to be sent. A check box 2422 is for selecting all of the personal meta-data items. An area 2423 is for displaying the personal meta-data items stored in the portable terminal. In this case, the items are the name, home address, and place of work of the photographee. Check boxes 2426 are for selecting certain personal meta-data items. The personal meta-data may have a hierarchical structure. In this embodiment, telephone numbers and addresses are included under the categories 'home' and 'place of work.' The hierarchical structure can be displayed by clicking on boxes 2427 and 2429. In the case of the box 2427, only the upper hierarchy is shown and an item 2428 ('home') is displayed. If the check box is checked at this time, every item in the hierarchy under 'home' (address, telephone number, etc.) will be selected. On the other hand, in the case of the box 2429, the items in the lower hierarchy are shown and the items 24210 ('address,' 'telephone number,' 'department name,' and 'E-mail address') are displayed. When the lower hierarchy is shown, each item may be individually selected by checking the check boxes. An OK button 2424 is for giving permission to send the personal meta-data. When the OK button 2424 is clicked, the selected items of the personal meta-data are sent to the imaging apparatus. A CANCEL button 2425 is for refusing to send the personal meta-data. When the CANCEL button 2425 is clicked, the transmission process is terminated and the screen 242 is turned off.

Figure 25:
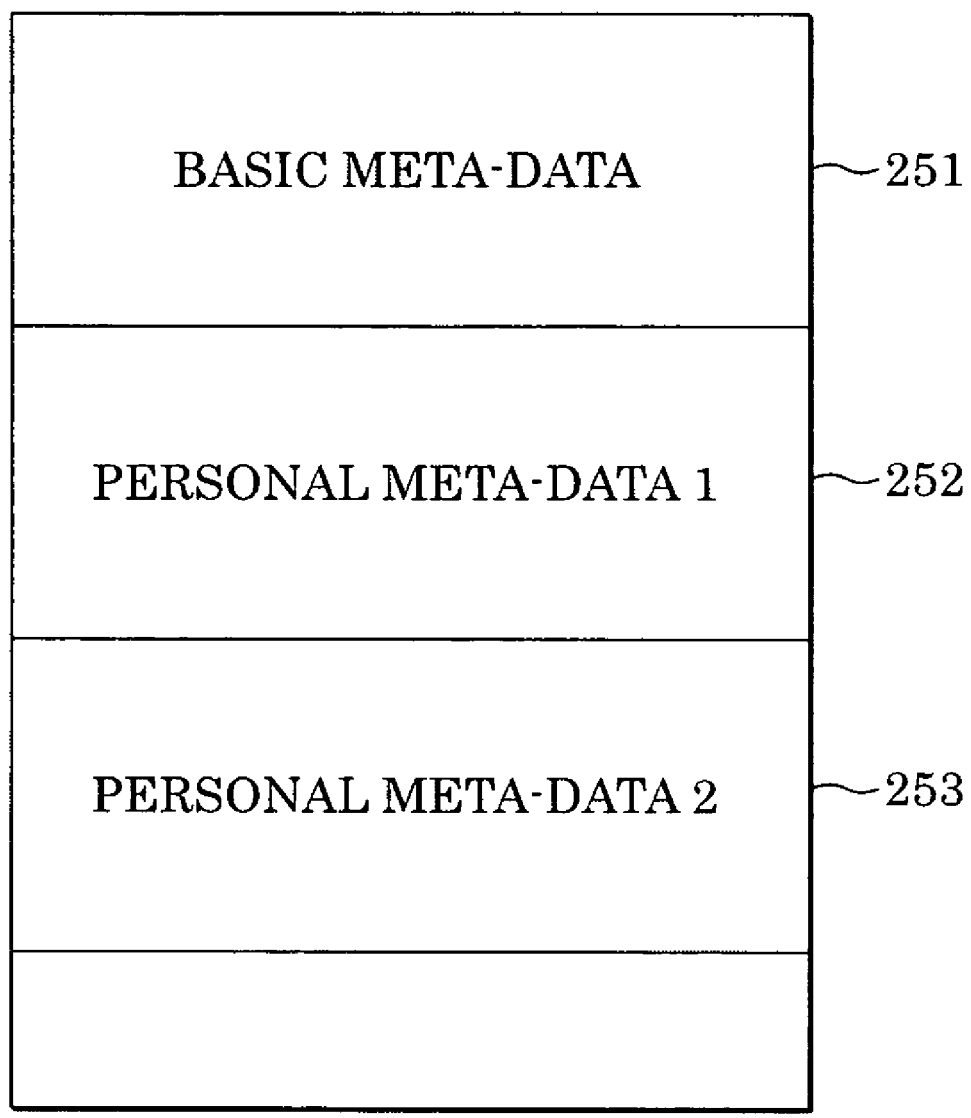
FIG. 25 illustrates an example of a format for storing personal meta-data and basic meta-data in association in the imaging apparatus.

FIG. 25 illustrates the data structure of the basic meta-data linked to the personal meta-data for a plurality of photographees.

The data structure of basic meta-data 251 is the same as that illustrated in FIG. 11. The basic meta-data 251 can be linked to the image through the basic meta-data included in the image data. Personal meta-data 252 and personal meta-data 253 are each for photographees captured in the corresponding image and are added to the basic meta-data in sequence.

FIG. 13 illustrates the data structure of personal meta-data according to this embodiment. In this case, the data is in XML (extensible Markup Language). A header 1301 of the XML document identifies the version and text encoding method. A text body 1302 has a hierarchical structure. In this case, a root element (uppermost hierarchy) 1303 is the personal meta-data, and under the root element 1303, elements such as NAME, OCCUPATION, HOME, PLACE OF WORK, and BIRTH DATE are included. Under HOME, elements such as ADDRESS, TELEPHONE NUMBER and E-MAIL ADDRESS are included. Under PLACE OF WORK, elements such as NAME OF COMPANY, OFFICE ADDRESS, TELEPHONE NUMBER, DEPARTMENT NAME and E-MAIL ADDRESS are included. In this case, the element names are equivalent to the items of the personal meta-data and the description inserted between a start tag and an end tag is the parameter of the personal meta-data item. For example, a NAME element 1304 is equivalent to a NAME item included in the personal meta-data. The parameter of the NAME item is equivalent to an entry 1305 or, in the example shown, 'TARO YAMASHITA.' This is the same for other items of the personal meta-data.

FIG. 14 is an example of a screen for inputting a search condition for conducting a search by using personal meta-data. A photographee can search through the content data from a screen 140 on a portable terminal or a personal computer connected to a network by using the collection of personal meta-data sent from the imaging apparatus.

A title bar 1400 is displayed on the screen 140. The title bar 1400 displays the title of the window and is for operating the entire window, such as changing the size of the window. A message 1401 for urging a user to carry out an operation is displayed. An area 1402 is used to specify the search condition and includes a search item 1405 and a combo box 1406. The name or E-mail address of the photographee to be searched can be input or selected from the pull-down list of personal meta-data items stored on the portable terminal or the personal computer. The pull-down list may be provided by referring to the list of personal meta-data items sent from the imaging apparatus to the portable terminal after an image has been captured or by using a list included in an address book. If a SEARCH button 1403 is clicked after the search condition is designated, the list of personal meta-data items stored on the portable terminal or personal computer is searched. Then, the personal meta-data matching the search condition is converted into the related basic meta-data. This converted basic meta-data is sent to the content management server 1501 as a search condition. Then, the content management server 1501 will find a content data item that matches this search condition. A CANCEL button 1404 is for interrupting the search.

By adopting the above-described structure, the privacy of photographees can be safely protected while information is exchanged by using personal information of the photographees.

Other Embodiments

In this embodiment, by setting the same group ID for both an imaging apparatus and a portable terminal, even if a photographee happens to be within a wireless communication range of a photographer belonging to a different group, such as a different tour group, the photographee can determine through a portable terminal possessed by the photographee whether or not the captured image concerns the photographee. In such a case, instead of using a group ID, a user ID of the photographer may also be used.

The structure of the imaging apparatus and the portable terminal according to this embodiment is the same as the structure according to the first and second embodiments. The process carried out by the imaging apparatus when capturing an image according to this embodiment is the same as the process according to the first and second embodiments. In this embodiment, Step S8000 (of FIG. 8 described above) in which a group ID is set is omitted.

Figure 19:
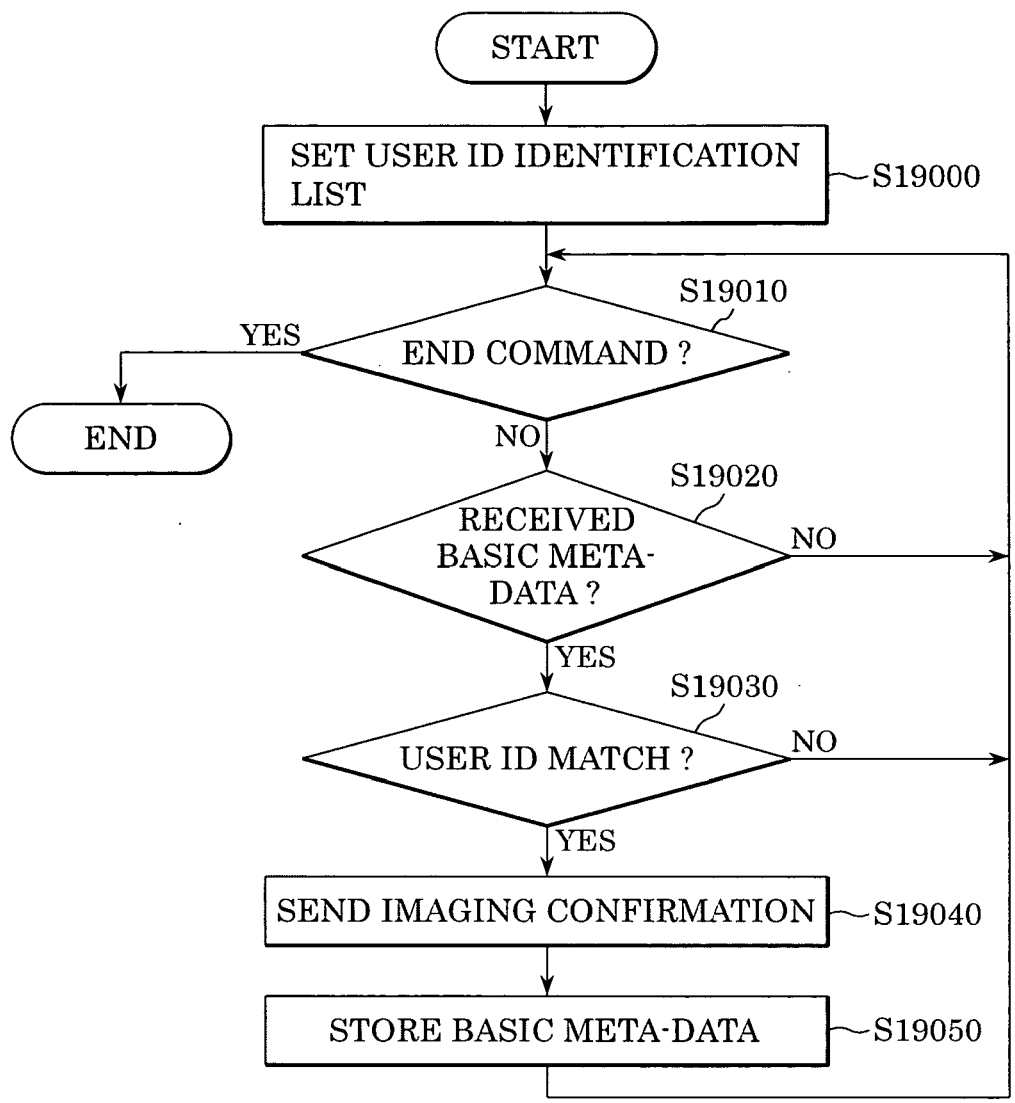
FIG. 19 is a flow chart illustrating the process followed by a portable terminal when capturing an image according to another embodiment of the present invention.

FIG. 19 is a flow chart illustrating another process of a portable terminal carried out when capturing an image. First, in Step S19000, a user ID identification list (details are described below) is set. There are various ways of setting the user IDs as described in the other embodiments. Since user IDs for every photographee that can be captured in an image have to be registered, the operation is usually repeated several times. In particular, when every member of the group may be a photographee, the user ID for every group member can be registered. In such a case, each user ID is registered in a memory card, which is the external memory 306 of the portable terminal, and the memory card of each group member can be exchanged within the group to read in each other's user IDs.

Since Steps S19010 and S19020 are the same as Steps S9010 and S9020, respectively, in FIG. 9, descriptions are omitted.

In Step S19030, it is checked whether the user ID included in the basic meta-data received in Step S19020 matches a user ID included in the user ID identification list registered in the portable terminal. If there are matching user IDs, the process proceeds to Step S19040. If there are no matching user IDs, the process proceeds to Step S19070.

Since Steps S19040 and S19050 are the same as Steps S9040 and S9050, respectively, in FIG. 9, descriptions are omitted.

Figure 20:
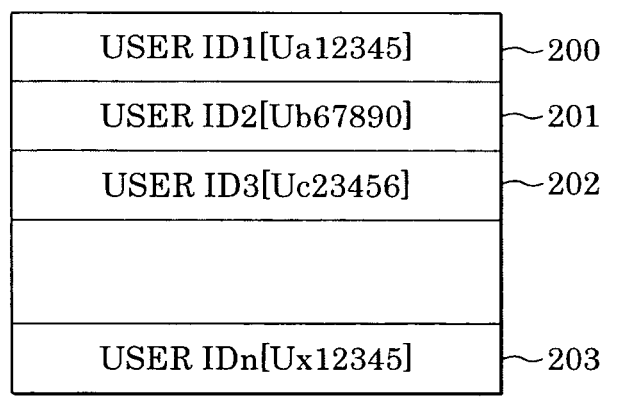
FIG. 20 illustrates an example of a list of user IDs pre-registered for a portable terminal held by a photographee.

FIG. 20 is a user ID list according to this embodiment pre-registered in a portable terminal held by a photographee.

The user ID list includes user IDs 200 to 203 for identifying photographers. In this embodiment, user IDs, such as Ua012345 and Ub567890, are stored in a portable terminal.

Group IDs may also be arranged in a group ID list in a similar manner as the user ID list. In this way, when a plurality of groups shares one imaging apparatus, these groups can be distinguished from each other. An example of such a condition is when a tour group is divided into sub-groups and each photographee belongs to more than one sub-group.

According to the embodiments, only meta-data is transmitted when an image is captured. The present invention, however, is not limited to this, and in addition to meta-data, the captured image may also be transmitted.

According to the embodiments, a captured image is identified by using an imaging apparatus ID for identifying the imaging apparatus used to capture the image and a content ID for identifying the number of the captured image. The present invention, however, is not limited to this. The captured image may be identified by a medium ID for identifying the medium used for the imaging apparatus used to capture the image and a content ID for identifying the number of the captured image. In such a case, the medium ID must be included in the basic meta-data.

According to the embodiments, the portable terminal returns a confirmation to the imaging apparatus notifying that an image has been captured. The present invention, however, is not limited to this.

According to the embodiments, the content data is image data. The present invention, however, is not limited to this, and the content data may also be audio data.

According to the present invention, attribute information that facilitates a search on input data is easily added to content data when the data is input.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:
   an image capturing unit configured to capture a subject and obtain image data of the subject;
   an acquiring unit configured to acquire attribute information relating to the image capturing;
   a storing unit configured to store the image data obtained by the image capturing unit and the attribute information acquired by the acquiring unit, linking the image data and the attribute information;
   a transmitting unit configured to transmit, to an external device, in response to the image capturing being performed by the image capturing unit, (a) predetermined information including attribute information of image data obtained as a result of the image capturing, and (b) group identification information for displaying, on the external device, a screen to select an item to be disclosed to the imaging apparatus from among user information relating to a user of the external device and to be associated with the image data, wherein the screen is displayed when the group identification information transmitted from the imaging apparatus matches group identification information stored in the external device; and
   a receiving unit configured to receive the selected user information relating to a user of the external device, the user information being selected by the user of the external device by using the screen displayed on the external device being based on the information transmitted by the transmitting unit,
   wherein the storing unit stores the received user information and the image data, further linking the received user information and the image data.

2. The imaging apparatus according to claim 1, wherein the attribute information of image data transmitted to the external device is used as a search condition for the external device to retrieve the image data.

3. The imaging apparatus according to claim 1, wherein the transmitting unit further transmits group identification information for identifying a group the imaging apparatus belongs to.

4. The imaging apparatus according to claim 3, wherein the imaging apparatus reads the group identification information previously stored in a storage medium.

5. The imaging apparatus according to claim 1, wherein the transmitting unit further transmits user identifying information for identifying a user of the imaging apparatus.

6. The imaging apparatus according to claim 1, wherein the transmitting unit further transmits apparatus identification information for identifying the imaging apparatus.

7. The imaging apparatus according to claim 1, further comprising:
   a communicating unit configured to establish communication between the imaging apparatus and the external device so as to enable sending and receiving data there between,
   wherein the transmitting unit transmits the attribute information to the external device where the communication with the imaging apparatus has been established since the image capturing by the capturing unit.

8. The imaging apparatus according to claim 1, wherein the acquiring unit acquires time information or location information as the attribute information of image data.

9. The imaging apparatus according to claim 1, wherein the user information includes an E-mail address.

10. A method for controlling an imaging apparatus, the method comprising:
    capturing a subject and obtaining image data of the subject;
    acquiring attribute information relating to the captured subject;
    storing the obtained image data of the subject and the acquired attribute information;
    linking the obtained image data and the acquired attribute information;
    transmitting, to an external device, in response to the image capturing, (a) predetermined information including attribute information of image data obtained as a result of the image capturing and (b) group identification information for displaying, on the external device, a screen to select an item to be disclosed to the imaging apparatus from among user information relating to a user of the external device and to be associated with the image data, therein the screen is displayed when the group identification information transmitted from the imaging apparatus matches group identification information stored in the external device;
    receiving the selected user information relating to a user of the external device, wherein the user information being selected by the user of the external device by using the screen displayed on the external device being based on the transmitted information; and
    storing and further linking the received user information and the obtained image data.

11. A computer-readable medium storing computer-executable process steps according to claim 10.

* * * * *